United States Patent
Xu et al.

(10) Patent No.: US 10,728,335 B2
(45) Date of Patent: Jul. 28, 2020

(54) DATA PROCESSING METHOD, STORAGE SYSTEM, AND SWITCHING DEVICE

(71) Applicant: Huawei Technologies Co., Ltd., Shenzhen (CN)

(72) Inventors: Huifeng Xu, Shenzhen (CN); Haitao Guo, Hangzhou (CN); Chunbao Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/360,906

(22) Filed: Mar. 21, 2019

(65) Prior Publication Data

US 2019/0222648 A1 Jul. 18, 2019

Related U.S. Application Data

(63) Continuation of application No. PCT/CN2017/080655, filed on Apr. 14, 2017.

(51) Int. Cl.
*H04L 29/08* (2006.01)
*G06F 3/06* (2006.01)
(Continued)

(52) U.S. Cl.
CPC ........ *H04L 67/1097* (2013.01); *G06F 3/0604* (2013.01); *G06F 3/067* (2013.01);
(Continued)

(58) Field of Classification Search
CPC ............. H04L 67/1097; H04L 67/1095; H04L 49/356; H04L 45/745; G06F 3/0665;
(Continued)

(56) References Cited

U.S. PATENT DOCUMENTS 7,382,776 B1 * 6/2008 Chan ................... H04L 45/7453
370/389
7,609,649 B1 * 10/2009 Bhandari ............ H04L 67/1097
370/252
(Continued)

FOREIGN PATENT DOCUMENTS

CN 104536702 A 4/2015
CN 105516263 A 4/2016
(Continued)

OTHER PUBLICATIONS

Machine Translation and Abstract of Chinese Publication No. CN104536702, Apr. 22, 2015, 28 pages.
(Continued)

*Primary Examiner* — Steven H Nguyen
(74) *Attorney, Agent, or Firm* — Conley Rose, P.C.

(57) ABSTRACT

A storage system includes a computing node and a switching device coupled to each other. The computing node sends a first network packet to the switching device, the first network packet carries a resource identifier, a first offset, and an input/output (I/O) command. The switching device determines an object storage device (OSD) corresponding to an I/O operation. The switching device generates a second offset according to the first offset and a size of the OSD, obtains a first network address of a first storage node accommodating a first OSD on which the I/O operation is to be performed and an identifier of the first OSD, generates a second network packet, and sends the second network packet to the first storage node. In the foregoing manner, a computation amount of the computing node can be decreased, and running efficiency of the computing node is improved.

20 Claims, 12 Drawing Sheets

(51) Int. Cl.
*G06F 12/00* (2006.01)
*G06F 16/182* (2019.01)
*G06F 13/10* (2006.01)
*H04L 12/741* (2013.01)
*H04L 12/931* (2013.01)

(52) U.S. Cl.
CPC ............ *G06F 3/0665* (2013.01); *G06F 12/00* (2013.01); *G06F 13/102* (2013.01); *G06F 16/1824* (2019.01); *H04L 45/745* (2013.01); *H04L 49/356* (2013.01); *H04L 67/1095* (2013.01); *G06F 3/0635* (2013.01)

(58) Field of Classification Search
CPC ........ G06F 12/00; G06F 3/067; G06F 3/0604; G06F 13/102; G06F 16/1824; G06F 3/0635
See application file for complete search history.

(56) References Cited

U.S. PATENT DOCUMENTS

| | | |
|---|---|---|
| 2004/0225691 A1 | 11/2004 | Hirao |
| 2006/0106878 A1* | 5/2006 | Shitomi .................. G06F 16/10 |
| 2007/0118676 A1* | 5/2007 | Kano ....................... G06F 3/067 |
| | | 710/315 |
| 2007/0156763 A1 | 7/2007 | Liu et al. |
| 2010/0211740 A1 | 8/2010 | Rajan et al. |
| 2012/0284431 A1 | 11/2012 | Otani |
| 2013/0054889 A1 | 2/2013 | Vaghani et al. |
| 2014/0181239 A1 | 6/2014 | Gaonkar et al. |
| 2014/0351513 A1 | 11/2014 | Tatara et al. |
| 2016/0139838 A1 | 5/2016 | D'Sa et al. |
| 2017/0177223 A1 | 6/2017 | Zhang et al. |
| 2017/0295239 A1 | 10/2017 | Fang |
| 2019/0310777 A1 | 10/2019 | Deguchi et al. |

FOREIGN PATENT DOCUMENTS

| | | |
|---|---|---|
| EP | 3196776 A1 | 7/2017 |
| JP | 2004334481 A | 11/2004 |
| JP | 2013525912 A | 6/2013 |
| WO | 2016041128 A1 | 3/2016 |
| WO | 2016054818 A1 | 4/2016 |
| WO | 2016101283 A1 | 6/2016 |
| WO | 2017046864 A1 | 3/2017 |

OTHER PUBLICATIONS

Machine Translation and Abstract of Chinese Publication No. CN105516263, Apr. 20, 2016, 29 pages.
Foreign Communication From a Counterpart Application, PCT Application No. PCT/CN2017/080655, English Translation of International Search Report dated Jan. 11, 2018, 2 pages.
Foreign Communication From a Counterpart Application, European Application No. 17905455.6, Extended European Search Report dated Jun. 26, 2019, 9 pages.
Foreign Communication From a Counterpart Application, European Application No. 17905455.6, European Office Action dated Feb. 4, 2020, 8 pages.
Foreign Communication From a Counterpart Application, Japanese Application No. 2019-526353, Japanese Office Action dated Jan. 28, 2020, 7 pages.
Foreign Communication From a Counterpart Application, Japanese Application No. 2019-526353, English Translation of Japanese Office Action dated Jan. 28, 2020, 6 pages.

* cited by examiner

US 10,728,335 B2

DATA PROCESSING METHOD, STORAGE SYSTEM, AND SWITCHING DEVICE

CROSS-REFERENCE TO RELATED APPLICATIONS

This application is a continuation of International Patent Application No. PCT/CN2017/080655 filed on Apr. 14, 2017, which is hereby incorporated by reference in its entirety.

TECHNICAL FIELD

This application relates to the field of information technologies, and in particular, to a data processing method, a storage system, and a switching device.

BACKGROUND

With increasing popularity of distributed storage, various new storage modes appear in a storage market, and an object storage technology becomes a new popular topic.

In an object storage system, each time a computing node performs an Input/Output (I/O) operation for a virtual disk, the computing node needs to obtain, through computation, a location of an Object Storage Device (OSD) corresponding to the I/O operation, and then initiate the I/O operation on the corresponding OSD.

Because the computing node further needs to receive and send a packet, and encapsulate and parse the packet, a process of computing the OSD corresponding to the I/O operation consumes a computation resource of the computing node, and especially in a scenario with relatively large I/O traffic, running efficiency of the computing node is reduced.

SUMMARY

This application discloses a data processing method, a storage system, and a switching device to decrease a computation amount of a computing node and improve running efficiency of the computing node.

According to a first aspect, this application provides a storage system. The storage system includes a computing node and a switching device that are connected to each other. The computing node sends a first network packet to the switching device, and the first network packet carries a resource identifier, a first offset, and an I/O command. After receiving the first network packet sent by the computing node, the switching device determines an OSD corresponding to an I/O operation. The switching device generates a second offset according to the first offset and a size of the OSD, and obtains, according to the resource identifier and the first offset, a first network address of a first storage node accommodating a first OSD on which an I/O operation is to be performed and an identifier of the first OSD, generates a second network packet, and sends the second network packet to the first storage node. The second network packet carries the second offset, the I/O command, and the identifier of the first OSD, and a destination address of the second network packet is the first network address. The second offset is an address offset of the first OSD on which the I/O operation is to be performed.

In the foregoing system, the computing node does not need to compute the OSD corresponding to the I/O operation, but the switching device searches for the OSD according to information carried in the first network packet from the computing node such that a computation amount of the computing node is decreased.

In an implementation of this application, the storage system further includes a plurality of storage nodes. The first storage node in the plurality of storage nodes is configured to receive the second network packet sent by the switching device, select the first OSD according to the identifier of the first OSD, and perform, according to the I/O command carried in the second network packet, the I/O operation on a storage address that is indicated by the second offset and that is in the first OSD.

The first storage node receives the second network packet from the switching device. Because the second network packet carries the identifier of the first OSD on which the I/O operation is to be performed and the second offset, the first storage node can perform the I/O operation according to the information carried in the second network packet. Therefore, in this application, the switching device searches for an OSD locally, and the I/O operation performed by the first storage node is not affected. In comparison with other approaches, the switching device in this application does not require modification to a storage node, and can be applied to various storage nodes.

The I/O operation may be a write operation or a read operation. When the I/O operation is the write operation, the I/O command includes a write I/O command and to-be-written data. When the I/O operation is the read operation, the I/O command includes a read I/O command and a read length.

In another implementation of this application, the first storage node is configured to write, according to the write I/O command, the to-be-written data into the storage address that is indicated by the second offset and that is in the first OSD.

Because the switching device searches locally for an OSD corresponding to the I/O operation, the computing node only needs to set the write I/O command and the to-be-written data in the first network packet, and send the first network packet to the switching device. After finding the OSD according to the first network packet, the switching device directly sends an identifier of the OSD, the write I/O command, and the to-be-written data to the first storage node accommodating the OSD. Therefore, the first storage node can perform the write operation according to the foregoing information without any modification such that the switching device in this application does not require modification to a storage node, and can be applied to various storage nodes.

In another implementation of this application, the to-be-written data from the computing node needs to be stored in a plurality of copies, that is, the to-be-written data needs to be stored into at least two storage nodes to enhance data security. In this case, the first network packet further carries a multi-copy operation code. The switching device is configured to obtain the first network address, the identifier of the first OSD, a second network address of a second storage node accommodating a second OSD on which a write operation is to be performed, and an identifier of the second OSD according to the resource identifier and the first offset. In addition to generating the second network packet and sending the second network packet to the first storage node, the switching device further generates a third network packet according to the multi-copy operation code, and sends the third network packet to the second storage node. The third network packet carries the second offset, the write I/O command, the to-be-written data, and the identifier of the second OSD, and a destination address of the third network packet is the second network address. The second storage node receives the third network packet, and writes, according to the write I/O command, the to-be-written data into a storage address that is indicated by the second offset and that is in the second OSD.

When performing a write operation on a virtual disk on which multi-copy backup is set, the computing node may notify, using the multi-copy operation code, the switching device that the write operation needs to be performed on both a primary OSD and a secondary OSD that are mapped to the virtual disk. In this case, the switching device generates a plurality of network packets, and sends the plurality of network packets to a storage node accommodating the primary OSD and a storage node accommodating the secondary OSD such that the to-be-written data can be written into both the primary OSD and the secondary OSD, and data consistency is ensured. Therefore, in this application, a function of the switching device is further expanded such that the switching device may convert, according to the multi-copy operation code, a write command from the computing node into a write command for a plurality of storage nodes.

In another implementation of this application, the first storage node is further configured to send a first response packet to the switching device, and the second storage node is further configured to send a second response packet to the switching device. The first response packet carries a first write result and a packet type identifier, and a destination address of the first response packet is a network address of the computing node. The second response packet carries a second write result and a packet type identifier, and a destination address of the second response packet is the network address of the computing node. The switching device is further configured to receive the first response packet and the second response packet, determines that the first response packet and the second response packet are key value (KV) packets according to the packet type identifiers, generates a third response packet, and sends the third response packet to the computing node. The third response packet carries the first write result and the second write result, and a destination address of the third response packet is the network address of the computing node. The computing node is further configured to receive the third response packet, and obtain the first write result and the second write result that are carried in the third response packet.

After receiving response packets returned by the at least two storage nodes, the switching device determines a type of the response packets, and performs combined encapsulation on a plurality of response packets returned by the at least two storage nodes to generate one response packet to be returned to the computing node. Therefore, responses from a plurality of storage nodes are aggregated into a single response, and the single response is returned to the computing node such that burden of the computing node is significantly reduced, and especially in a scenario with relatively large I/O traffic, the embodiments of the present disclosure have a more obvious advantage.

When the received packet carries a packet type identifier, the switching device determines that the packet is a KV packet, parses the packet, and searches for an OSD according to information obtained by parsing, or when the packet does not carry the packet type identifier, the switching device determines that the packet is a non-KV packet, and directly forwards the packet according to a destination address of the packet. Therefore, the switching device in this application further has a function of forwarding a non-KV packet, and can be compatible with various network systems.

In another implementation of this application, the first storage node is configured to read, according to the read I/O command, data of the read length from the storage address that is indicated by the second offset and that is in the first OSD. The I/O command carried in the first network packet and the second network packet includes the read I/O command and the read length.

Because the switching device searches locally for an OSD corresponding to the I/O operation, the computing node only needs to set the read I/O command and the read length in the first network packet, and sends the first network packet to the switching device. After finding the OSD according to the first network packet, the switching device directly sends an identifier of the OSD, the read I/O command, and the read length to the first storage node accommodating the OSD. Therefore, the first storage node can perform the read operation according to the foregoing data without any modification such that the switching device in this application is applied to various storage nodes.

In another implementation of this application, the switching device is configured to perform a modulo operation on the first offset using the size of the OSD as a divisor, and use an obtained result as the second offset.

When the resource identifier is a volume number of a virtual volume in a virtual disk on the computing node, this application is applicable when the virtual disk is a block storage system. When the resource identifier is a file system identifier and a file identifier that are of a virtual file in a virtual disk on the computing node, this application is applicable when the virtual disk is a file storage system.

The first offset is an offset in the virtual volume or the virtual file. The virtual volume or the virtual file actually includes a plurality of virtual spaces each with the size of the OSD, and each virtual space has a mapping relationship with an OSD. The first offset may be greater than the OSD. Therefore, the first offset is not applicable to the OSD. A modulo operation needs to be performed on the first offset using the size of the OSD as a divisor, and a size of the obtained second offset is less than or equal to the size of the OSD.

In another implementation of this application, the switching device is configured to obtain, according to a volume number of a virtual disk on the computing node and the first offset, the first network address of the first storage node accommodating the first OSD on which the I/O operation is to be performed and the identifier of the first OSD, where the resource identifier is the volume number of the virtual disk on the computing node.

In another implementation of this application, the resource identifier is a file system identifier and a file identifier, and the switching device is configured to obtain, according to the file system identifier, the file identifier, and the first offset, the first network address of the first storage node accommodating the first OSD on which the I/O operation is to be performed and the identifier of the first OSD.

In another implementation of this application, the first network packet further carries a packet type identifier, and the switching device is further configured to determine that the first network packet is a KV packet according to the packet type identifier.

When the switching device receives a packet and the packet carries a packet type identifier, the switching device determines that the packet is a KV packet, parses the packet, and searches for an OSD according to information obtained by parsing, or when the packet does not carry the packet type identifier, the switching device determines that the packet is a non-KV packet, and directly forwards the packet according to a destination address of the packet. Therefore, the switching device in this application further has a function of forwarding a non-KV packet, and can be compatible with various network systems.

In another implementation of this application, the first network packet is a transmission control protocol (TCP) packet, and the packet type identifier is set in an options field and a padding field that are in an IP header of the TCP packet.

Because the options field and the padding field are usually idle, the fields of the Internet Protocol (IP) header are used to carry the packet type identifier. When determining a type of a packet, the switching device only needs to analyze the IP header, and does not need to disassemble an IP data field such that processing the packet can be accelerated.

This application provides a implementation in which the switching device obtains the OSD corresponding to the I/O operation.

In another implementation of this application, the switching device is configured to perform a rounding operation on the first offset according to the size of the OSD to obtain a rounding result, obtain a key corresponding to the resource identifier and the rounding result, and search a comparison table to determine the first network address of the first storage node and the identifier of the first OSD that correspond to the key. The comparison table includes a correspondence between a key, a network address of a storage node, and an identifier of an OSD.

The first offset is an offset in the virtual volume or the virtual file. The virtual volume or the virtual file actually includes a plurality of virtual spaces each with the size of the OSD, and each virtual space has a mapping relationship with an OSD. Therefore, the virtual spaces correspond to a quantity of OSDs. It only needs to ensure that one virtual space corresponds to one key, and that one virtual space corresponds to one key can be implemented using the rounding operation.

In another implementation of this application, the switching device is configured to perform a rounding operation on the first offset according to the size of the OSD to obtain a rounding result, and use the resource identifier and the rounding result as input parameters of a consistent hash algorithm to run the consistent hash algorithm to obtain a corresponding key.

Therefore, in this application, the key may be obtained from the resource identifier and the rounding result by searching the table or using the hash operation.

In another implementation of this application, the comparison table includes a global view table and a partition map table. The global view table includes a correspondence between a key and an OSD number, and the OSD number is used to identify a unique OSD in the storage system. The partition map table includes a correspondence between an OSD number, a network address of a storage node, and an identifier of an OSD. The switching device is configured to search the global view table to determine an OSD number corresponding to the obtained key, and search the partition map table to determine the first network address of the first storage node accommodating the first OSD and the identifier of the first OSD corresponding to the OSD number.

In another implementation of this application, the storage system further includes a metadata control node connected to the switching device. The metadata control node records metadata of the storage system. The metadata includes the global view table and the partition map table. The switching device is further configured to receive the global view table and the partition map table that are sent by the metadata control node.

Because the switching device receives the global view table and the partition map table that are sent by the metadata control node, and does not need to re-generate a global view table and a partition map table, system compatibility is improved.

According to a second aspect, this application provides a data processing method, including sending, by a computing node, a first network packet to a switching device, where the first network packet carries a resource identifier, a first offset, an I/O command, generating, by the switching device, a second offset according to the first offset and a size of an OSD, obtaining, according to the resource identifier and the first offset, a first network address of a first storage node accommodating a first OSD on which an I/O operation is to be performed and an identifier of the first OSD, generating, by the switching device, a second network packet, and sending the second network packet to the first storage node, where the second network packet carries the second offset, the I/O command, and the identifier of the first OSD, and a destination address of the second network packet is the first network address.

Any one of the second aspect or implementations of the second aspect is a method implementation corresponding to any one of the first aspect or the implementations of the first aspect. Descriptions in any one of the first aspect or the implementations of the first aspect are applicable to any one of the second aspect or the implementations of the second aspect, and details are not described herein.

According to a third aspect, this application provides a data processing method, including receiving, by a switching device, a first network packet sent by a computing node, where the first network packet carries a resource identifier, a first offset, and an I/O command, generating, by the switching device, a second offset according to the first offset and a size of an OSD, obtaining, according to the resource identifier and the first offset, a first network address of a first storage node accommodating a first OSD on which an I/O operation is to be performed and an identifier of the first OSD, generating, by the switching device, a second network packet, and sending the second network packet to the first storage node, where the second network packet carries the second offset, the I/O command, and the identifier of the first OSD, and a destination address of the second network packet is the first network address.

In the foregoing data processing method, the computing node does not need to compute the OSD corresponding to the I/O operation, but the switching device searches for the OSD according to information carried in the first network packet from the computing node such that a computation amount of the computing node is decreased.

According to a fourth aspect, this application provides a switching device. The switching device includes a receiving module configured to receive a first network packet sent by a computing node, where the first network packet carries a resource identifier, a first offset, and an I/O command, a processing module configured to generate a second offset according to the first offset and a size of an OSD, obtain, according to the resource identifier and the first offset, a first network address of a first storage node accommodating a first OSD on which an I/O operation is to be performed and an identifier of the first OSD, and generate a second network packet, where the second network packet carries the second offset, the I/O command, and the identifier of the first OSD, and a destination address of the second network packet is the first network address, and a sending module configured to send the second network packet to the first storage node.

Any one of the fourth aspect or implementations of the fourth aspect is a method implementation corresponding to any one of the third aspect or the implementations of the third aspect. Descriptions in any one of the third aspect or the implementations of the third aspect are applicable to any one of the fourth aspect or the implementations of the fourth aspect, and details are not described herein.

In an implementation of this application, the I/O command includes a write I/O command and to-be-written data, and the first network packet further carries a multi-copy operation code. The processing module is configured to obtain the first network address, the identifier of the first OSD, a second network address of a second storage node accommodating a second OSD on which a write operation is to be performed, and an identifier of the second OSD according to the resource identifier and the first offset. The processing module is further configured to generate a third network packet according to the multi-copy operation code. The third network packet carries the second offset, the write I/O command, the to-be-written data, and the identifier of the second OSD, and a destination address of the third network packet is the second network address. The sending module is further configured to send the third network packet to the second storage node.

In another implementation of this application, the receiving module is further configured to receive a first response packet sent by the first storage node and a second response packet sent by the second storage node. The first response packet carries a first write result and a packet type identifier, and a destination address of the first response packet is a network address of the computing node. The second response packet carries a second write result and a packet type identifier, and a destination address of the second response packet is the network address of the computing node. The processing module is further configured to determine that the first response packet and the second response packet are KV packets according to the packet type identifiers, generate a third response packet, and send the third response packet to the computing node. The third response packet carries the first write result and the second write result, and a destination address of the third response packet is the network address of the computing node.

In another implementation of this application, the processing module is configured to perform a modulo operation on the first offset using the size of the OSD as a divisor, and use an obtained result as the second offset.

In another implementation of this application, the resource identifier is a volume number of a virtual disk on the computing node, and the processing module is configured to obtain, according to the volume number and the first offset, the first network address of the first storage node accommodating the first OSD on which the I/O operation is to be performed and the identifier of the first OSD.

In another implementation of this application, the resource identifier is a file system identifier and a file identifier, and the processing module is configured to obtain, according to the file system identifier, the file identifier, and the first offset, the first network address of the first storage node accommodating the first OSD on which the I/O operation is to be performed and the identifier of the first OSD.

In another implementation of this application, the first network packet further carries a packet type identifier, and the processing module is further configured to determine that the first network packet is a KV packet according to the packet type identifier.

In another implementation of this application, the processing module is further configured to perform a rounding operation on the first offset according to the size of the OSD to obtain a rounding result, obtain a key corresponding to the resource identifier and the rounding result, and search a comparison table to determine the first network address of the first storage node and the identifier of the first OSD that correspond to the key. The comparison table includes a correspondence between a key, a network address of a storage node, and an identifier of an OSD.

In another implementation of this application, the comparison table includes a global view table and a partition map table. The global view table includes a correspondence between a key and an OSD number, and the OSD number is used to identify an OSD in a storage system. The partition map table includes a correspondence between an OSD number, a network address of a storage node, and an identifier of an OSD. The processing module is configured to search the global view table to determine an OSD number corresponding to the obtained key, and search the partition map table to determine the first network address of the first storage node accommodating the first OSD and the identifier of the first OSD corresponding to the OSD number.

In another implementation of this application, the receiving module is further configured to receive the global view table and the partition map table that are sent by a metadata control node.

According to a fifth aspect, this application provides a switching device, and the switching device has a function of implementing the switching device in the foregoing method practice. The function may be implemented using hardware, or may be implemented by hardware executing corresponding software. The hardware or software includes one or more modules corresponding to the foregoing function. Optionally, the switching device may be a network side device, such as a switch or a physical server that implements a switch function.

According to a sixth aspect, this application provides a switch. The switch includes a processor, a memory, and a plurality of physical ports. The switch performs functions of the switching device according to the foregoing aspects. The processor is configured to support the switching device in performing a corresponding function in the foregoing method, for example, generating or processing data and/or information related in the foregoing method.

According to a seventh aspect, this application provides a computer storage medium configured to store a computer software instruction used by the foregoing switching device. The computer software medium includes a program designed for performing various implementations of the foregoing aspects.

DESCRIPTION OF EMBODIMENTS

The technical solutions according to embodiments of the present disclosure are clearly described in the following with reference to the accompanying drawings. The described embodiments are merely some but not all of the embodiments of the present disclosure.

Figure 1:
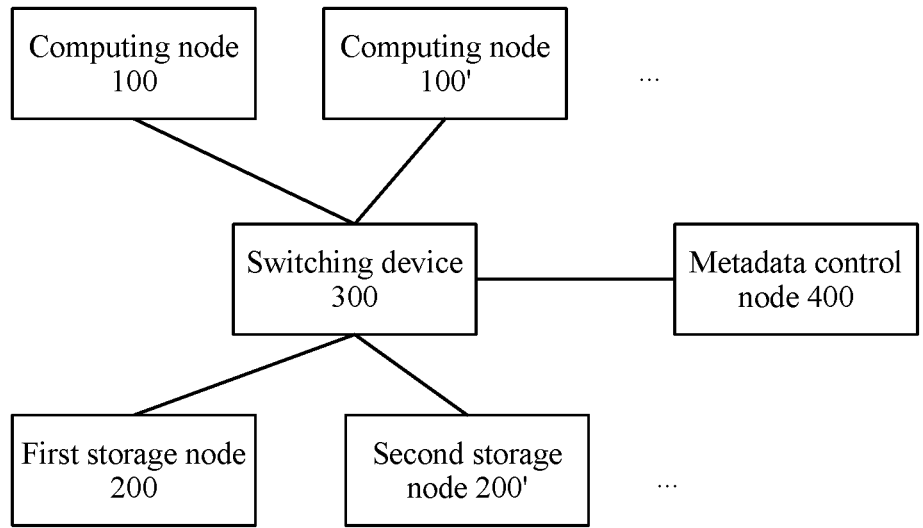
FIG. 1 is a schematic diagram of a system structure of a storage system according to an embodiment of the present disclosure.

Referring to FIG. 1 first, FIG. 1 is a schematic diagram of a system structure of a storage system according to an embodiment of the present disclosure. As shown in FIG. 1, the storage system according to this embodiment of the present disclosure includes a switching device 300, a computing node cluster, a storage node cluster, and a metadata control node 400. The computing node cluster includes a plurality of computing nodes such as a computing node 100 and a computing node 100'. The storage node cluster includes a plurality of storage nodes such as a first storage node 200 and a second storage node 200'. In the storage system in this embodiment of the present disclosure, any computing node can establish a point-to-point connection to the metadata control node 400 and any storage node using the switching device 300.

It is noteworthy that quantities of the computing nodes, the storage nodes, and the metadata control nodes may be set according to an actual requirement. Generally, because the embodiments of the present disclosure relate to a distributed storage technology, two storage nodes are used as an example for description in the following embodiments. In product implementation, the switching device 300 may be at least one switch or router.

In this embodiment of the present disclosure, after receiving a network packet sent by a computing node, the switching device 300 obtains, according to a resource identifier and an offset that are carried in the network packet, a network address of a storage node accommodating an OSD on which a write/read operation is to be performed and an OSD identifier of the OSD on the storage node, generates a network packet that carries an I/O command, and sends the network packet to the storage node such that the storage node may perform a read/write operation on the OSD of the storage node according to the I/O command.

In this embodiment of the present disclosure, the switching device 300 performs a KV operation function to search for a network address and an OSD of a storage node. The computing node does not need to establish a connection to the metadata control node during each I/O operation to search for a network address and an OSD on the metadata control node such that a computation amount of a computing node can be decreased, and network load can be reduced.

For clear description, referring to FIG. 2 to FIG. 5, structures of the computing node 100, the first storage node 200, the second storage node 200', the metadata control node 400, and the switching device 300 are separately described in FIG. 2 to FIG. 5.

Figure 2:
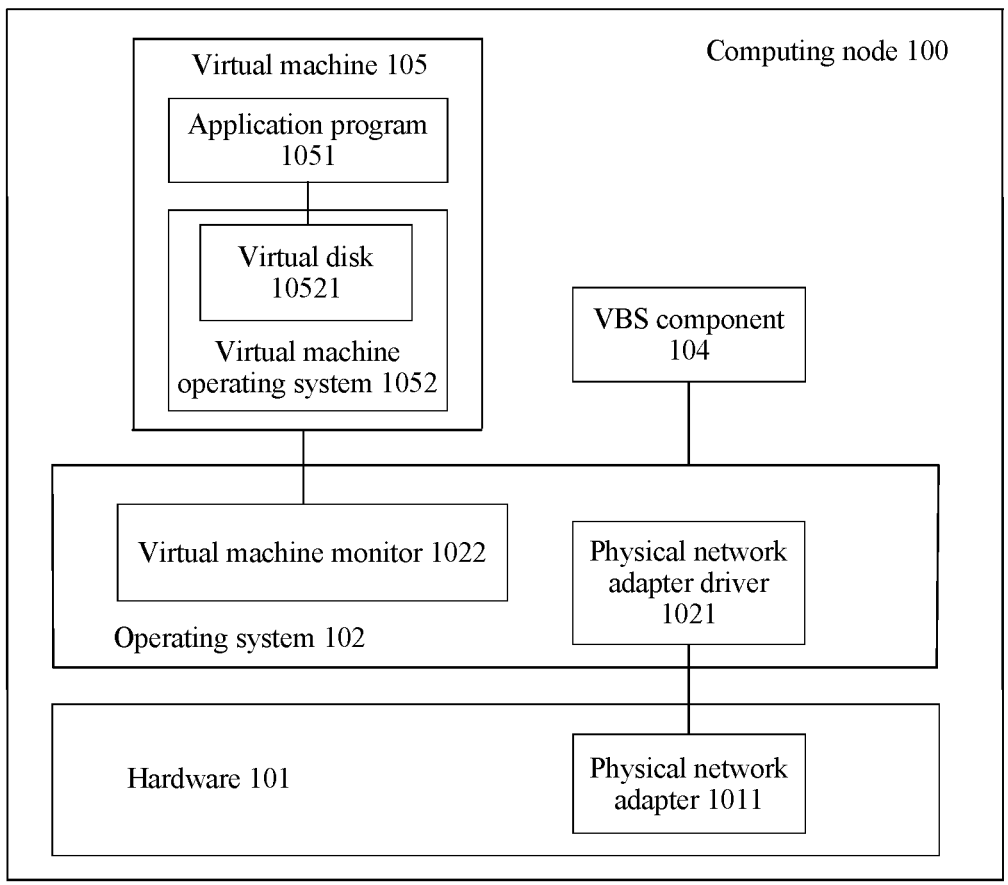
FIG. 2 is a schematic diagram of an apparatus structure of a computing node according to an embodiment of the present disclosure.

Referring to FIG. 2, FIG. 2 is a schematic diagram of an apparatus structure of a computing node 100 according to an embodiment of the present disclosure. As shown in FIG. 2, the computing node 100 includes hardware 101, an operating system 102, a Virtual Block System (VBS) component 104, and a virtual machine 105.

The hardware 101 includes a physical network adapter 1011. The operating system 102 includes a virtual machine monitor 1022 and a physical network adapter driver 1021. The virtual machine 105 includes an application program 1051 and a virtual machine operating system 1052, and a virtual disk 10521 is disposed in the virtual machine operating system 1052.

The physical network adapter 1011 is a network component operating at a network link layer, and is an interface that connects a computing node and a transmission medium in a network. The physical network adapter 1011 sets a network address for the computing node 100. The network address may be a media access control (MAC) address or an IP address. The computing node can be identified in the network using the network address. The physical network adapter 1011 may set one or more network addresses. In this embodiment, the physical network adapter 1011 only needs to set one network address. However, it is noteworthy that a plurality of network addresses may be set in a relatively complex network environment.

For example, the physical network adapter 1011 may set the IP address of the computing node 100 to 192.168.1.11.

The physical network adapter driver 1021 is disposed on the operating system 102, and provides an interface for the physical network adapter 1011. The VBS component 104 may control, using the interface provided by the physical network adapter driver 1021, the physical network adapter 1011 to receive or send a network packet.

The VBS component 104 is installed and runs on the operating system 102, and the VBS component 104 provides a distributed storage access service for the computing node 100.

The VBS component 104 is provided with a network port on the operating system 102. The VBS component 104 communicates with an external network using the network port of the VBS component 104. The network port of the VBS component 104 is, for example, 10001, and network ports of VBS components of each computing node in a storage system are the same.

The virtual machine monitor 1022 is disposed on the operating system 102, and the virtual machine monitor 1022 creates, for the virtual machine operating system 1052, virtual hardware that is independent of the actual hardware 101.

The application program 1051 runs on the virtual machine operating system 1052, the virtual disk 10521 is disposed in the virtual machine operating system 1052, and the application program 1051 may perform a read/write operation on the virtual disk 10521.

In some examples, the virtual disk 10521 is provided with a plurality of virtual volumes, and a volume number is allocated to each virtual volume. When performing a read/write operation on a virtual volume, the application program 1051 generates a read/write instruction that includes a volume number and a first offset. The first offset indicates a read/write location of the virtual volume corresponding to the volume number. The virtual machine operating system 1052 sends the read/write instruction to the virtual machine monitor 1022. The VBS component 104 obtains the read/write instruction from the virtual machine monitor 1022.

In other examples, the virtual disk 10521 is provided with a plurality of virtual files. Each virtual file is provided with a file system identifier and a file identifier. The file system identifier is an identifier of a file system accommodating a file, and is used to identify a file format such as File Allocation Table (FAT) or New Technology File System (NTFS). When performing a read/write operation on a virtual file, the application program 1051 generates a read/write instruction that includes a file system identifier, a file identifier, and a first offset. The first offset indicates a read/write location of the virtual file corresponding to the file system identifier and the file identifier. The virtual machine operating system 1052 sends the read/write instruction to the virtual machine monitor 1022. The VBS component 104 obtains the read/write instruction from the virtual machine monitor 1022.

It is noteworthy that a structure of the computing node 100' shown in FIG. 1 is the same as that of the computing node 100, and details are not described herein.

Figure 3:
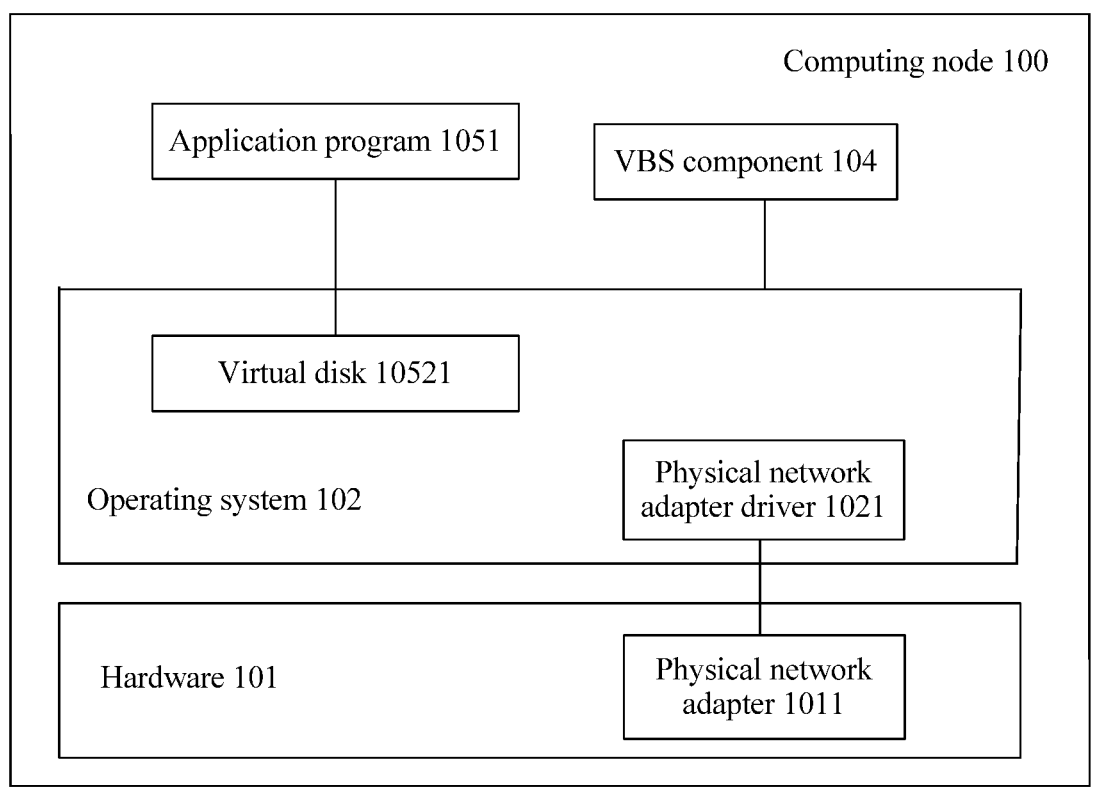
FIG. 3 is a schematic diagram of another apparatus structure of a computing node according to an embodiment of the present disclosure.

Optionally, further, referring to FIG. 3, FIG. 3 is a schematic diagram of another apparatus structure of a computing node 100 according to an embodiment of the present disclosure. As shown in FIG. 3, in other examples, the computing node 100 may not use a virtual structure. An application program 1051 directly runs on an operating system 102. A VBS component 104 provides a distributed storage access service for the node accommodating the VBS component 104. For example, the operating system 102 may map a distributed storage space provided by the VBS component 104 to a virtual disk 10521, and when accessing the virtual disk 10521, the application program 1051 actually accesses the distributed storage space using the VBS component 104.

In the structure shown in FIG. 3, the virtual disk 10521 may be provided with a plurality of virtual volumes, and a volume number is allocated to each virtual machine volume. When performing a read/write operation on a virtual volume, the application program 1051 generates a read/write instruction that includes a volume number and a first offset. The first offset indicates a read/write location of the virtual volume corresponding to the volume number. The operating system 102 sends the read/write instruction to the VBS component 104.

In other examples, the virtual disk 10521 is provided with a plurality of virtual files. Each virtual file is provided with a file system identifier and a file identifier. The file system identifier is an identifier of a file system accommodating a file. The file system may be, for example, FAT or NTFS. The file identifier is an identifier of the file in the file system. When performing a read/write operation on a virtual file, the application program 1051 generates a read/write instruction that includes a file system identifier, a file identifier, and a first offset. The first offset indicates a read/write location of the virtual file corresponding to the file system identifier and the file identifier. The operating system 102 sends the read/write instruction to the VBS component 104.

Figure 4:
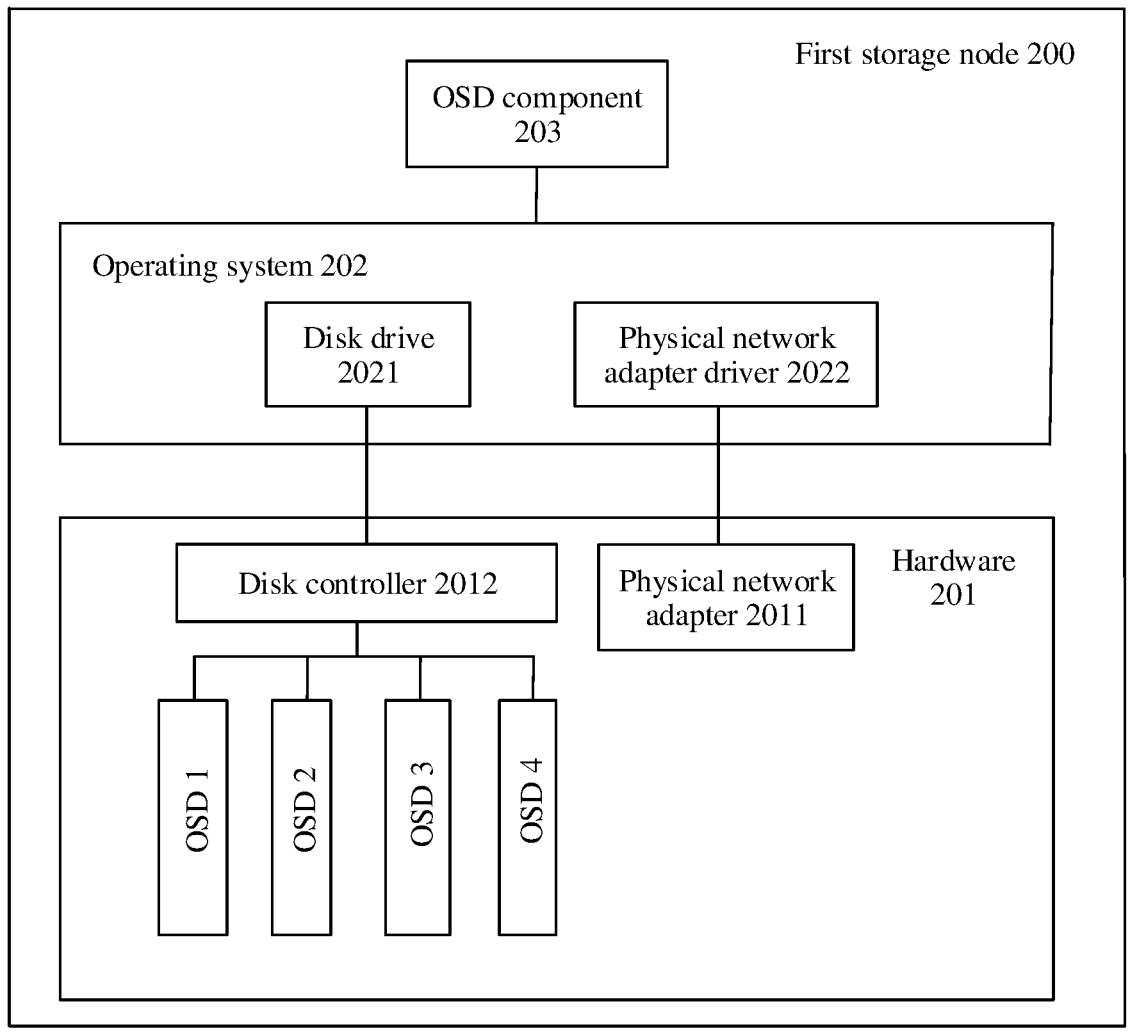
FIG. 4 is a schematic diagram of an apparatus structure of a storage node according to an embodiment of the present disclosure.

Referring to FIG. 4, FIG. 4 is a schematic diagram of an apparatus structure of a storage node according to an embodiment of the present disclosure. As shown in FIG. 4, the first storage node 200 includes hardware 201, an operating system 202, and an OSD component 203.

The hardware 201 includes a physical network adapter 2011, a disk controller 2012, an OSD 1, an OSD 2, an OSD 3, and an OSD 4. The operating system 202 includes a disk drive 2021 and a physical network adapter driver 2022.

The OSD component 203 is installed and runs on the operating system 202. In this embodiment, each OSD is provided with an identifier, and the OSD component 203 manages different OSDs using identifiers of the OSDs.

It is noteworthy that the OSD is disposed on a physical disk. In some examples, one OSD is disposed in one physical disk. In other examples, a plurality of OSDs are disposed in one physical disk, and sizes of the OSDs are the same, for example, the size may be 10 megabytes (MB).

In this embodiment, in each storage node, an OSD identifier is allocated to each OSD, and the OSD identifier may be used to identify an OSD in the storage node. For example, an identifier of the OSD 1 is 0000, an identifier of the OSD 2 is 0001, the identifier of the OSD 3 is 0002, and an identifier of the OSD 4 is 0003. The identifiers of the OSDs in the first storage node 200 are recorded by the OSD component 203.

Further, in a storage system in this embodiment of the present disclosure, an OSD number is further allocated to each OSD. The OSD number may be used to identify an OSD in the storage system, and the OSD number is recorded, for example, in the metadata control node 400.

For example, an OSD number of the OSD 1 in the first storage node 200 is 0×00000000.

The physical network adapter 2011 sets a network address for the first storage node 200. The OSD component 203 may control, using an interface provided by the physical network adapter driver 2022, the physical network adapter 2011 to send or receive a network packet.

For example, the physical network adapter 2011 sets an IP address of the first storage node 200 to 192.168.1.12.

The disk drive 2021 is disposed on the operating system 202, and provides an interface on the operating system 202. The OSD component 203 controls the disk controller 2012 using the interface.

The disk controller 2012 may be, for example, a disk drive adapter, receives and parses a Small Computer System Interface (SCSI) instruction sent by the OSD component 203 using the interface provided by the disk drive 2021 on the operating system 202, and performs a read/write operation on a physical disk accommodating the OSD.

The OSD component 203 is provided with a network port on the operating system 202. For example, the network port of the OSD component 203 is 10002.

Figure 5:
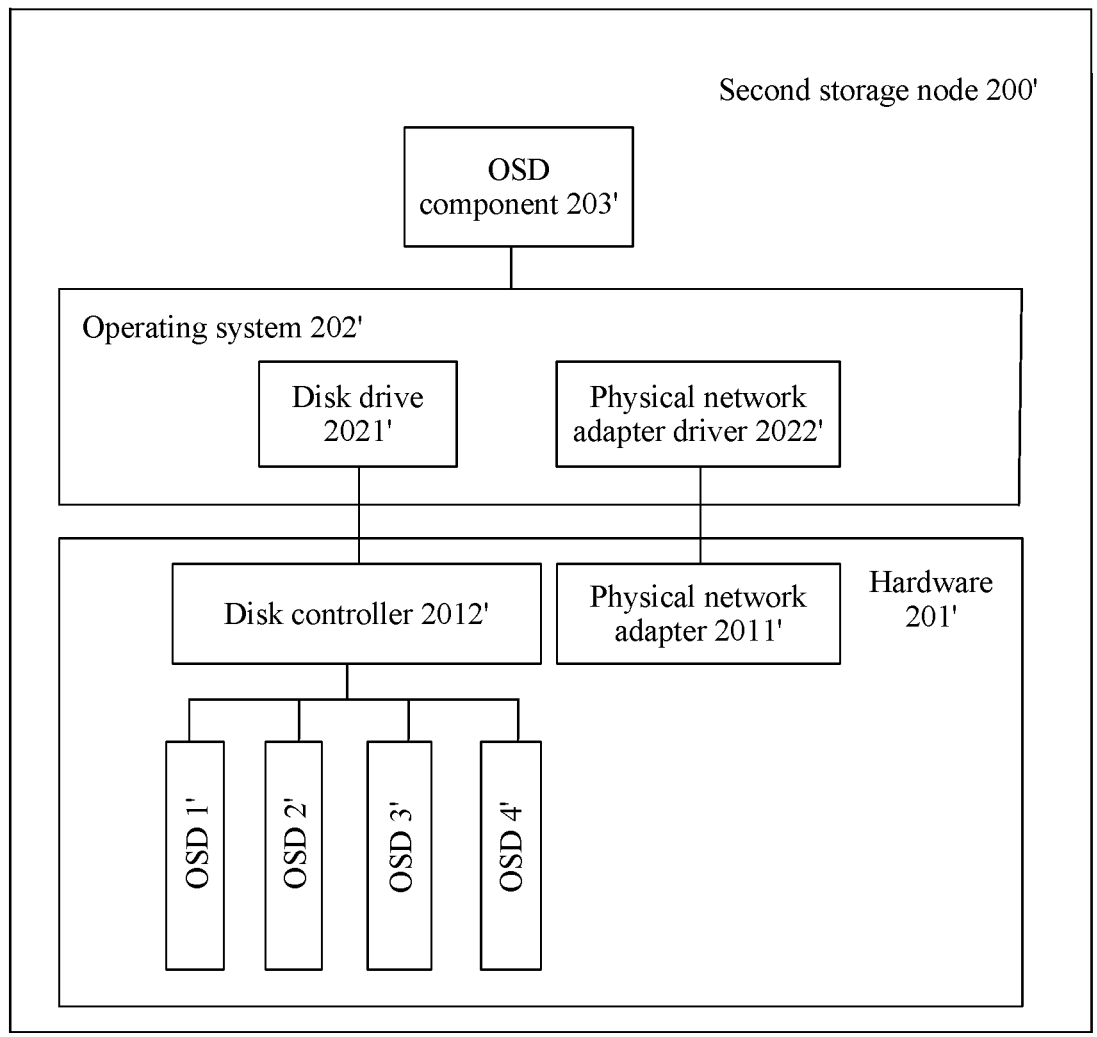
FIG. 5 is a schematic diagram of an apparatus structure of another storage node according to an embodiment of the present disclosure.

Referring to FIG. 5, FIG. 5 is a schematic diagram of an apparatus structure of another storage node according to an embodiment of the present disclosure. It is noteworthy that a structure of the second storage node 200' is approximately the same as that of the first storage node 200, and a difference lies in that a physical network adapter 2011' of the second storage node 200' provides, for the second storage node 200', a network address different from that provided for the first storage node 200. For example, an IP address of the second storage node 200' is 192.168.1.13. In addition, similar to the first storage node 200, an OSD component 203' further records an identifier of an OSD on the second storage node 200'. In this embodiment, an OSD identifier of an OSD 1' may be 0000, an OSD identifier of an OSD 2' may be 0001, and an OSD identifier of an OSD 3' may be 10002, and an OSD identifier of an OSD 4' may be 0003. In addition, a network port of the OSD component 203' on the operating system 202' of the second storage node 200' may be, for example, 10002. The second storage node 200' further includes a hardware 201' including a disk controller 2012'. Further the operating system 202' of the second storage node 200' includes disk drive 2021' and physical network adapter driver 2022'.

Figure 6:
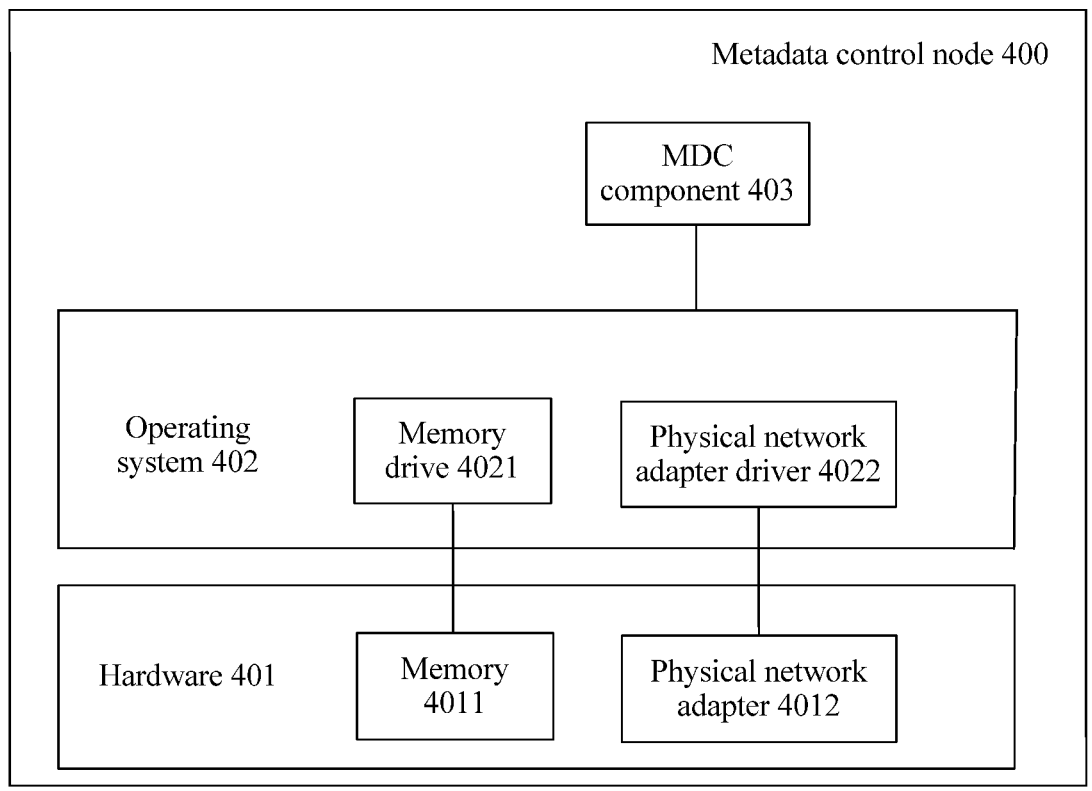
FIG. 6 is a schematic diagram of an apparatus structure of a metadata control node according to an embodiment of the present disclosure.

Referring to FIG. 6, FIG. 6 is a schematic diagram of an apparatus structure of a metadata control node 400 according to an embodiment of the present disclosure. The metadata control node 400 includes hardware 401, an operating system 402, and a Metadata Controller (MDC) component 403. The hardware 401 includes a memory 4011 and a physical network adapter 4012. The operating system 402 includes a memory drive 4021 and a physical network adapter driver 4022.

Similarly, the physical network adapter driver 4022 provides an interface on the operating system 402. The MDC component 403 running on the operating system 402 controls, using the interface, the physical network adapter 4012 to receive or send a network packet.

For example, the physical network adapter 4012 sets an IP address of the metadata control node 400 as 192.168.1.14.

Further, the memory drive 4021 provides an interface on the operating system 402. The MDC component 403 writes data into the memory 4011 or reads data from the memory 4011 using the interface.

In this embodiment of the present disclosure, the MDC component 403 may record a correspondence between a key and an OSD. The MDC component 403 receives status information reported by each storage node in a storage system, sorts the status information and keys recorded by the MDC component 403 into a comparison table, and stores the comparison table into the memory 4011. The status information includes an identifier of an OSD recorded by the OSD component in the storage node and an IP address of the storage node accommodating the OSD. For example, the comparison table is as follows:

| Key | IP address of a storage node accommodating a primary OSD | Identifier of the primary OSD | IP address of a storage node accommodating a secondary OSD | Identifier of the secondary OSD |
|---|---|---|---|---|
| 0x 0000000000000000 | 192.168.1.12 | 0x 0001 | 192.168.1.13 | 0x 0002 |
| 0x 0000000000000001 | 192.168.1.13 | 0x 0002 | 192.168.1.12 | 0x 0003 |
| 0x 0000000000000002 | 192.168.1.13 | 0x 0003 | 192.168.1.12 | 0x 0001 |
| 0x 0000000000000003 | 192.168.1.12 | 0x 0004 | 192.168.1.13 | 0x 0004 |

Comparison table

In the comparison table, the secondary OSD is a backup of the primary OSD. In some scenarios, when data is written into the primary OSD, the data also needs to be written into the secondary OSD, to ensure a data consistency requirement. It is noteworthy that, the foregoing table only shows a scenario in which one key corresponds to one primary OSD and one secondary OSD. However, in other examples, one key corresponds to only one primary OSD, or one key corresponds to one primary OSD and three or more secondary OSDs.

Optionally, the comparison table includes a global view table and a partition map table. The global view table includes a correspondence between each key and a corresponding OSD number in the storage system. The OSD number is used to identify an OSD in the storage system. The partition map table includes a mapping relationship between each OSD number, a network address of a corresponding storage node, and an identifier of a corresponding OSD.

For example, the global view table is as follows:

| Global view table | |
|---|---|
| KEY | OSD Number |
| 0x 0000000000000000 | 0x 00000000 |
| 0x 0000000000000001 | 0x 00000001 |
| 0x 0000000000000002 | 0x 00000002 |
| 0x 0000000000000003 | 0x 00000003 |

For example, in the global view table, both the key and the OSD number are represented in hexadecimal. A data read length of the key is 8 bytes, and a data read length of the OSD number is 4 bytes.

In some examples, when an operating system of a computing node loads a virtual volume, a VBS component performs a hash operation according to a volume number of the virtual volume and each offset in the virtual volume in order to obtain a key. The volume number of the virtual volume and the offset in the virtual volume are in a one-to-one correspondence with the key. Further, the VBS component may first perform a rounding operation on the offset in the virtual volume according to a size of the OSD, and perform a hash operation on a rounding result and the volume number of the virtual volume in order to obtain a key.

In other examples, when an operating system of a computing node loads a virtual file, a VBS component performs a hash operation according to a file system identifier and a file identifier that are of the virtual file and each offset in the virtual file in order to obtain a key. The file system identifier, the file identifier, and the offset in the virtual file are in a one-to-one correspondence with the key. Further, the VBS component may first perform a rounding operation on the offset in the virtual file according to a size of the OSD, and perform a hash operation on the file system identifier and the file identifier that are of the virtual file and the rounding result in order to obtain a key.

It is noteworthy that, by performing a rounding operation on the offset according to the size of the OSD, the virtual volume or the virtual file is divided in a unit of the size of the OSD. In a virtual volume or a virtual file, spaces corresponding to the size of the OSD correspond to the same OSD.

Further, OSD numbers in the global view table are numbers of all OSDs in the storage system, and may be generated by a computing node. For example, when obtaining a first key through computation, the computing node may correspondingly allocate, to the key, an OSD number, for example, 0, when obtaining a second key through computation, the computing node may correspondingly allocate, to the key, another OSD number, for example, 1, and so on. The key is in a one-to-one correspondence with the OSD number.

In addition, an allocated OSD number may be synchronized between computing nodes such that there is no repeated OSD number in the storage system.

For example, the partition map table is as follows

| Partition map table | | | | |
|---|---|---|---|---|
| OSD number | IP address of a node accommodating a primary OSD | Identifier of the primary OSD | IP address of a node accommodating a secondary OSD | Identifier of the secondary OSD |
| 0x 00000000 | 192.168.1.12 | 0x 0001 | 192.168.1.13 | 0x 0002 |
| 0x 00000001 | 192.168.1.13 | 0x 0002 | 192.168.1.12 | 0x 0003 |
| 0x 00000002 | 192.168.1.13 | 0x 0003 | 192.168.1.12 | 0x 0001 |
| 0x 00000003 | 192.168.1.12 | 0x 0004 | 192.168.1.13 | 0x 0004 |

For ease of description, in this embodiment, only one group of secondary OSD is shown. In some examples, there may be two or more identifiers of secondary OSDs, that is, in the storage system, there are two or more backups corresponding to the primary OSD.

Similarly, the MDC component 403 is provided with a network port on the operating system 402. The MDC component 403 communicates with an external network using the network port of the MDC component 403, for example, the port of the MDC component 403 is 10003.

It is noteworthy that, in the storage system, each OSD component has a unified network port, each VBS component has a unified network port, and the network port of the OSD component is different from the network port of the VBS component. Each OSD component records the network port of the VBS component.

Figure 7:
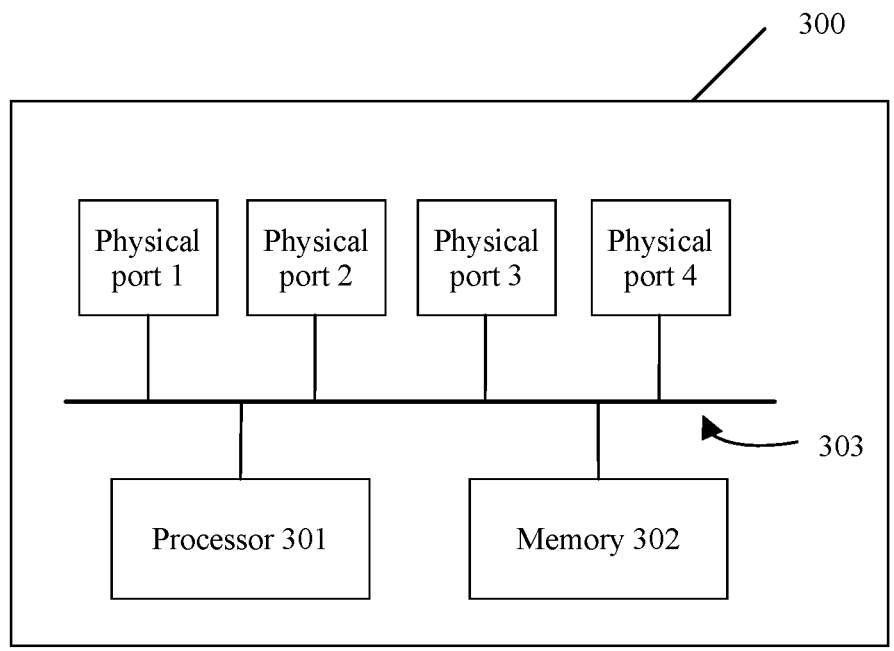
FIG. 7 is a schematic diagram of an apparatus structure of a switching device according to an embodiment of the present disclosure.

Referring to FIG. 7, FIG. 7 is a schematic diagram of an apparatus structure of a switching device according to an embodiment of the present disclosure. As shown in FIG. 7, the switching device 300 includes a processor 301, a memory 302, a bus 303, and physical ports 1 to 4.

The processor 301, the memory 302, and the physical ports 1 to 4 are separately connected to the bus 303. The physical ports 1 to 4 may be connected to a computing node or a storage node using a cable, and receive a network packet from the computing node or the storage node. The network packet passes through a transceiver and the bus, and is parsed and processed by the processor.

For example, the cable includes but not limited to a twisted pair, a fiber, or the like.

Further, the processor 301 may select a physical port according to a destination address of the network packet, and send the network packet from the selected physical port to a computing node or a storage node that is connected to the physical port.

It is noteworthy that a quantity of ports shown in FIG. 7 is merely an example. In this embodiment of the present disclosure, the quantity of physical ports is not limited. In other examples, the quantity of the physical ports may be 8, 16, 32, 64, or another number, and may be set according to a requirement.

In addition, alternatively, a plurality of switching devices may be connected through cascading in order to implement port extension.

For ease of description, in this embodiment of the present disclosure, it is assumed that the physical port 1 shown in FIG. 7 is connected to the computing node 100 shown in FIG. 1 using a cable, the physical port 2 is connected to the first storage node 200 shown in FIG. 1 using a cable, the physical port 3 is connected to the second storage node 200' shown in FIG. 1 using a cable, and the physical port 4 is connected to the metadata control node 400 shown in FIG. 1 using a cable.

The ports of the switching device are connected to a physical network adapter of each node using different cables.

In addition, a port forwarding rule table is pre-recorded in the memory 302 of the switching device 300, and is shown as follows:

| Port forwarding rule table | |
|---|---|
| Physical port | IP address |
| 1 | 192.168.1.11 |
| 2 | 192.168.1.12 |
| 3 | 192.168.1.13 |
| 4 | 192.168.1.14 |

192.168.1.11 is an IP address of the computing node 100, 192.168.1.12 is an IP address of the first storage node 200, 192.168.1.13 is an IP address of the second storage node 200', and 192.168.1.14 is an IP address of the metadata control node 400.

After the physical port 1, the physical port 2, the physical port 3, or the physical port 4 of the switching device 300 receives a network packet, the processor 301 analyzes a destination network address of the received network packet, queries the port forwarding rule table for a physical port corresponding to the destination address, and selects the physical port to forward the network packet to a computing node or a storage node that is connected to the physical port.

It is noteworthy that, in this embodiment, the network address being an IP address is used as an example for description. In an alternative embodiment, the network address may be a MAC address, and the port forwarding rule table may record a correspondence between a physical port and a MAC address.

In addition, in an optional embodiment, a switch or a router may be disposed between a physical port and a storage node, a computing node, or a metadata control node. The switching device 300 may select a physical port according to a destination address of a received network packet, and send the network packet to the switch or the router, and the network packet is forwarded to a storage node, a computing node, or a metadata control node corresponding to the destination address using the switch or the router.

In some embodiments, the switching device 300 may receive, using the physical port 3, a global view table and a partition map table that are sent by the metadata control node 400, and store the global view table and the partition map table into the memory 302.

In other embodiments, the global view table and the partition map table are written into the memory 302 when the switching device 300 is produced, and the global view table and the partition map table are built into the memory 302.

It is noteworthy that, in other embodiments, functions of the metadata control node 400 may be implemented by the switching device 300.

Figure 8:
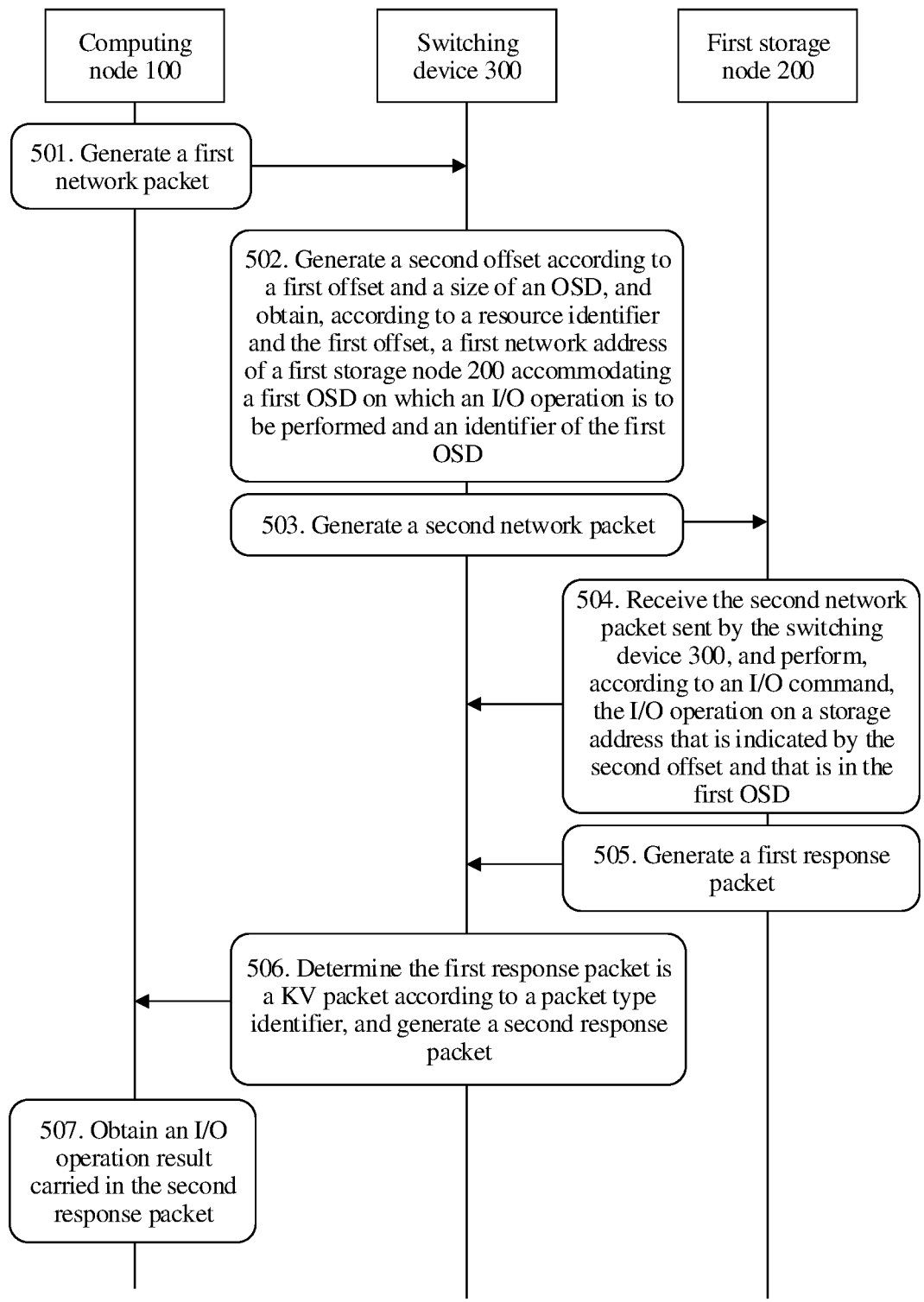
FIG. 8 is a flowchart of a first embodiment of an information processing method according to the present disclosure.

Referring to FIG. 8, FIG. 8 is a flowchart of a first embodiment of an information processing method according to the present disclosure. FIG. 8 shows a process of performing one I/O operation in a storage system. As shown in FIG. 8, the information processing method in this embodiment of the present disclosure includes the following steps.

Step 501: A computing node 100 generates a first network packet, and sends the first network packet to a switching device 300, where the first network packet carries a resource identifier, a first offset, and an I/O command, a destination address of a first network address may be null, and a source address is a network address of the computing node.

In some examples, the resource identifier is a volume number of a virtual disk on the computing node. In other examples, the resource identifier is a file system identifier and a file identifier.

In some examples, the first network packet further carries a packet type identifier, and the packet type identifier is used to notify the switching device 300 to process the first network packet.

For example, the resource identifier is the file identifier and the file system identifier in the virtual disk on the computing node, and the computing node 100 has a structure shown in FIG. 2. An application program 1051 sends a command "write to-be-written data starting from a $256^{th}$ kilobyte (KB) space in a file readme.txt in a current directory". A file system of a virtual machine operating system 1052 generates a write I/O command according to the foregoing command, obtains the to-be-written data, and queries a FAT of the file system to learn a file identifier of the file readme.txt and a file system identifier of the file system (for example, FAT32) accommodating the file readme.txt. The first offset is a space starting from the $256^{th}$ KB in the file readme.txt. The virtual machine operating system 1052 sends the file identifier, the file system identifier, the first offset, and the I/O command to a virtual machine monitor 1022. The I/O command includes the write I/O command and the to-be-written data.

Further, the virtual machine monitor 1022 sends the file identifier, the file system identifier, the first offset, and the I/O command to a VBS component 104. The VBS component 104 generates a first network packet including the file identifier, the file system identifier, the first offset, and the I/O command. The VBS component 104 controls, using an interface provided by a physical network adapter driver 1021, a physical network adapter 1011 to send the first network packet to a physical port 1 of the switching device 300.

Step 502: The switching device 300 receives the first network packet, generates a second offset according to the first offset and a size of an OSD, and obtains, according to the resource identifier and the first offset, a first network address of a first storage node 200 accommodating a first OSD on which an I/O operation is to be performed and an identifier of the first OSD.

Figure 9:
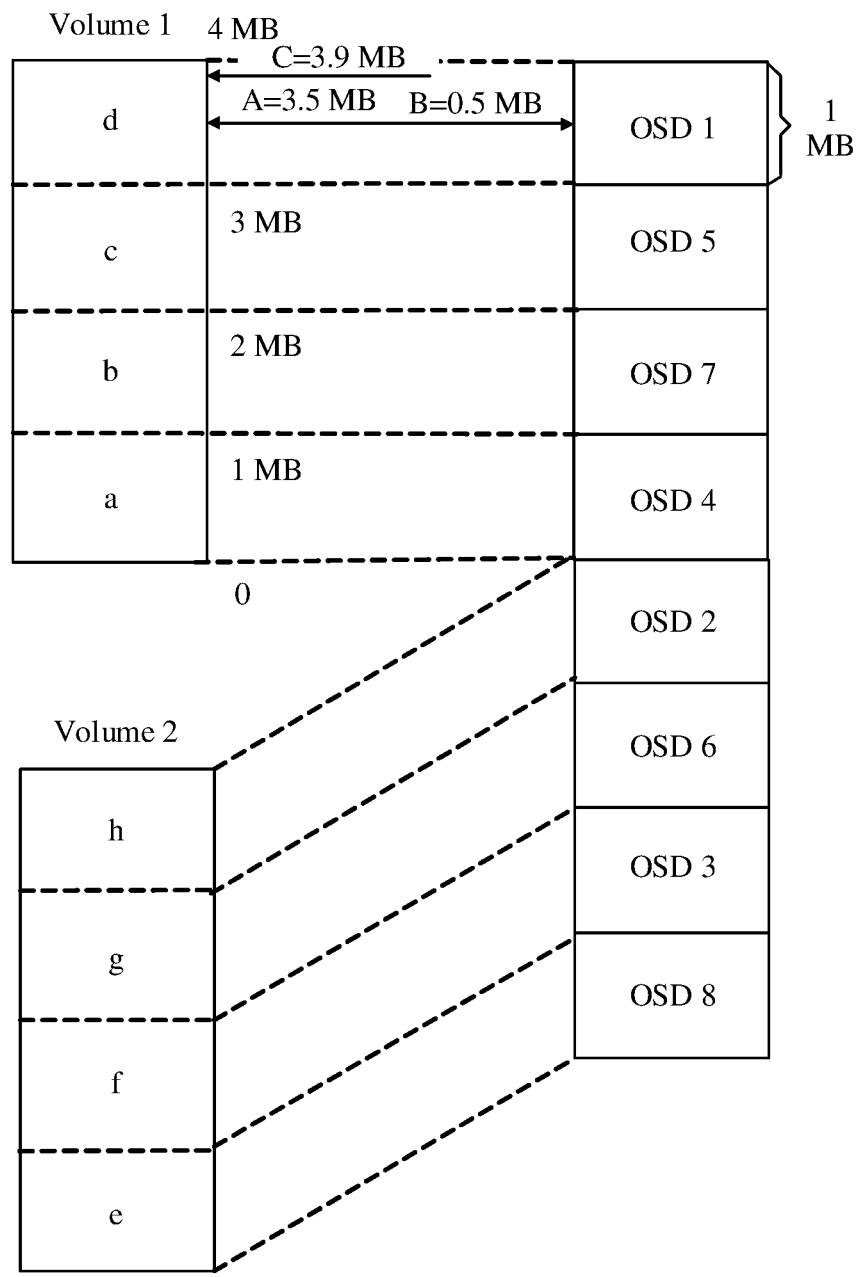
FIG. 9 is a diagram of a mapping relationship between a volume of a virtual disk and an OSD according to an embodiment of the present disclosure.

In some examples, the switching device 300 performs a modulo operation on the first offset using the size of the OSD as a divisor, and uses an obtained result as the second offset. For ease of description, referring to FIG. 9, FIG. 9 is a diagram of a mapping relationship between a volume of a virtual disk and an OSD according to an embodiment of the present disclosure. In FIG. 9, a volume 1 corresponds to an OSD 1, an OSD 5, an OSD 7, and an OSD 4, and a volume 2 corresponds to an OSD 2, an OSD 6, an OSD 3, and an OSD 8. When the application program 1051 of the computing node 100 needs to perform an I/O operation on a first offset A in the virtual volume 1 of a virtual disk 10521, the application program 1051 actually performs an I/O operation on a second offset B of the OSD 1. If a size of the volume 1 is 4 MB, A is 3.5 MB, and a size of each OSD is 1 MB, when the I/O operation needs to be performed on data starting from 3.5 MB in the virtual volume 1, the modulo operation only needs to be performed on 3.5 MB using 1 MB as a divisor, and the obtained result is B=0.5 MB, that is, the I/O operation is performed on data starting from 0.5 MB in the OSD 1.

In some examples, the switching device 300 performs a rounding operation on the first offset according to the size of the OSD to obtain a rounding result, obtains a key corresponding to the resource identifier and the rounding result, and searches a comparison table to determine the first network address of the first storage node and the identifier of the first OSD corresponding to the key. The comparison table includes a correspondence between a key, a network address of a storage node, and an identifier of an OSD. As shown in FIG. 9, both OSDs corresponding to the first offset A (3.5 MB) and a third offset C (3.9 MB) are the OSD 1. If A is directly used as an input parameter to perform a hash operation with a volume number of the virtual volume 1, and C is used as an input parameter to perform a hash operation with the volume number of the volume 1, two different results are obtained, that is, A and C correspond to two OSDs. Therefore, in this embodiment of the present disclosure, a rounding operation is performed on A according to the size of the OSD, and a rounding result 3.5/1=3 is obtained. A rounding operation is performed on C according to the size of the OSD, and a rounding result 3.9/1=3 is obtained. Results obtained by performing a hash operation on the volume number of the volume 1 separately according to two rounding results 3 are consistent in order to ensure that both A and C correspond to the OSD 1. After rounding processing is performed on an offset in the virtual volume 1, all offsets that are in a space d in the virtual volume 1 and that correspond to the OSD 1 are rounded, then a hash operation is performed on the volume number of the virtual volume 1 using all the offsets, and obtained results are all the same, that is, all the offsets correspond to the same OSD 1, a mapping relationship between a virtual volume and an OSD can be established.

In another example, the first offset may be a block number. For example, the virtual volume includes a plurality of blocks having a same data length, the blocks have consecutive numbers, each block is provided with the same data length, and a block in the virtual volume may be located using the block number (the first offset). Correspondingly, the OSD may be divided into blocks of the same data length, and a block in the OSD may be located using a block number (the second offset).

In some examples, only when the switching device 300 determines that the first network packet is a KV packet according to the packet type identifier, can the switching device 300 perform the step of generating a second offset according to the first offset and a size of an OSD, and obtaining a first network address of a first storage node accommodating a first OSD on which an I/O operation is to be performed and an identifier of the first OSD according to the resource identifier and the first offset. When the first network packet does not carry the packet type identifier and the first network packet is a non-KV packet, the switching device 300 directly selects a physical port according to the destination address of the first network packet, and sends the first network packet. Therefore, whether the first network packet is a KV packet is determined according to the packet type identifier such that the switching device 300 can process both a KV packet and a non-KV packet, and system compatibility is improved.

Further, the comparison table includes a global view table and a partition map table. The global view table includes a correspondence between a key and an OSD number, and the OSD number is used to identify an OSD in the storage system. The partition map table includes a correspondence between an OSD number, a network address of a storage node, and an identifier of an OSD.

For example, the switching device 300 may search the global view table to determine an OSD number corresponding to the obtained key, and search the partition map table to determine the first network address of the first storage node accommodating the first OSD and the identifier of the first OSD corresponding to the OSD number.

The switching device 300 is further configured to receive the global view table and the partition map table that are sent by a metadata control node 400.

Step 503: The switching device 300 generates a second network packet, and sends the second network packet to the first storage node 200, where the second network packet carries the second offset, the I/O command, and the identifier of the first OSD, a destination address of the second network packet is the first network address, and a source address may be the network address of the computing node 100.

For example, the switching device 30 selects a port 2 according to the first network address, and sends the second network packet using the port 2.

Step 504: The first storage node 200 receives the second network packet sent by the switching device 300, and performs the I/O operation on a storage address that is indicated by the second offset and that is in the first OSD according to the I/O command.

In some examples, when the I/O command includes a write I/O command and to-be-written data, the first storage node 200 is configured to write, according to the write I/O command, the to-be-written data into the storage address that is indicated by the second offset and that is in the first OSD.

In other examples, when the I/O command includes a read I/O command and a read length, the first storage node 200 is configured to read, according to the read I/O command, data of the data length from the storage address that is indicated by the second offset and that is in the first OSD.

For example, a physical network adapter 2011 of the first storage node 200 receives the second network packet from the physical port 2, and an OSD component 203 obtains the second network packet from the physical network adapter 2011 using an interface provided by the physical network adapter driver 2022.

Step 505: The first storage node 200 sends a first response packet to the switching device 300, where the first response packet carries an I/O operation result and a packet type identifier, and a destination address of the first response packet is the network address of the computing node.

For example, the OSD component 203 generates the first response packet carrying the I/O operation result and the packet type identifier, and controls, using the interface provided by the physical network adapter driver 2022, the physical network adapter 2011 to send the first response packet to the physical port 2.

Step 506: The switching device 300 determines that the first response packet is a KV packet according to the packet type identifier, generates a second response packet, and sends the second response packet to the computing node 100, where the second response packet carries the I/O operation result, a destination address of the second response packet is the network address of the computing node 100, and a source address is the network address of the first storage node 200.

For example, the switching device 300 selects a physical port 1 according to a network address 192.168.1.11 of the computing node 100, and sends the second response packet to the computing node 100 using the physical port 1.

Step 507: The computing node 100 receives the second response packet, and obtains the I/O operation result carried in the second response packet.

For example, the physical network adapter 1011 of the computing node 100 receives the second response packet from the physical port 1, and the VBS component 104 receives the second response packet from the physical network adapter 1011 using the interface provided by the physical network adapter driver 1021, parses the second response packet to obtain the I/O operation result, and sends the I/O operation result to the application program 1051.

In this embodiment of the present disclosure, because the switching device searches for an OSD locally, the computing node does not need to compute a key, and does not need to establish a network connection to a metadata control node during each I/O operation. Therefore, a computation amount of the computing node can be decreased, and network load is reduced.

Figure 10A:
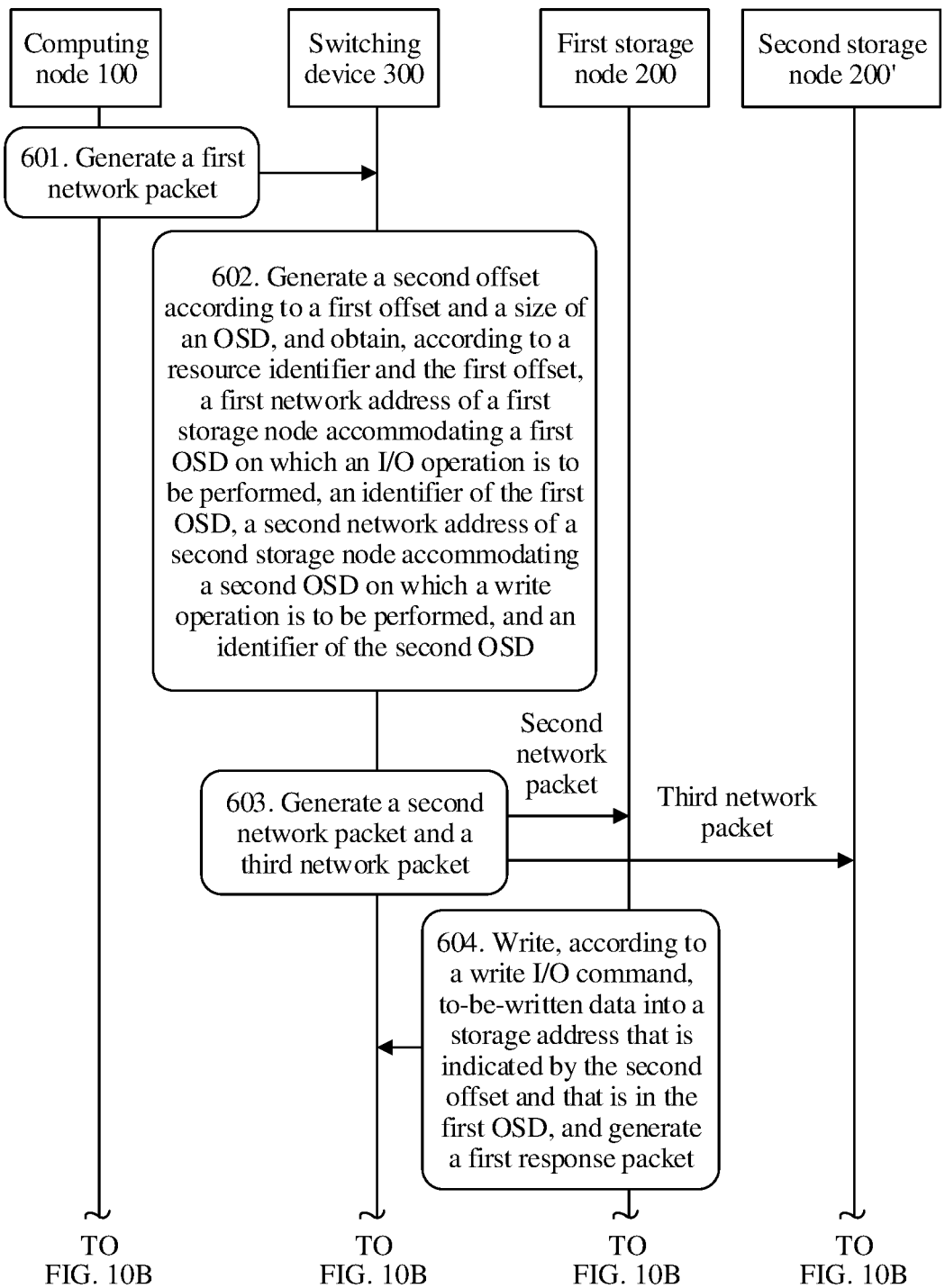
FIG. 10A and FIG. 10B are a flowchart of a second embodiment of an information processing method according to the present disclosure.
Figure 10B:
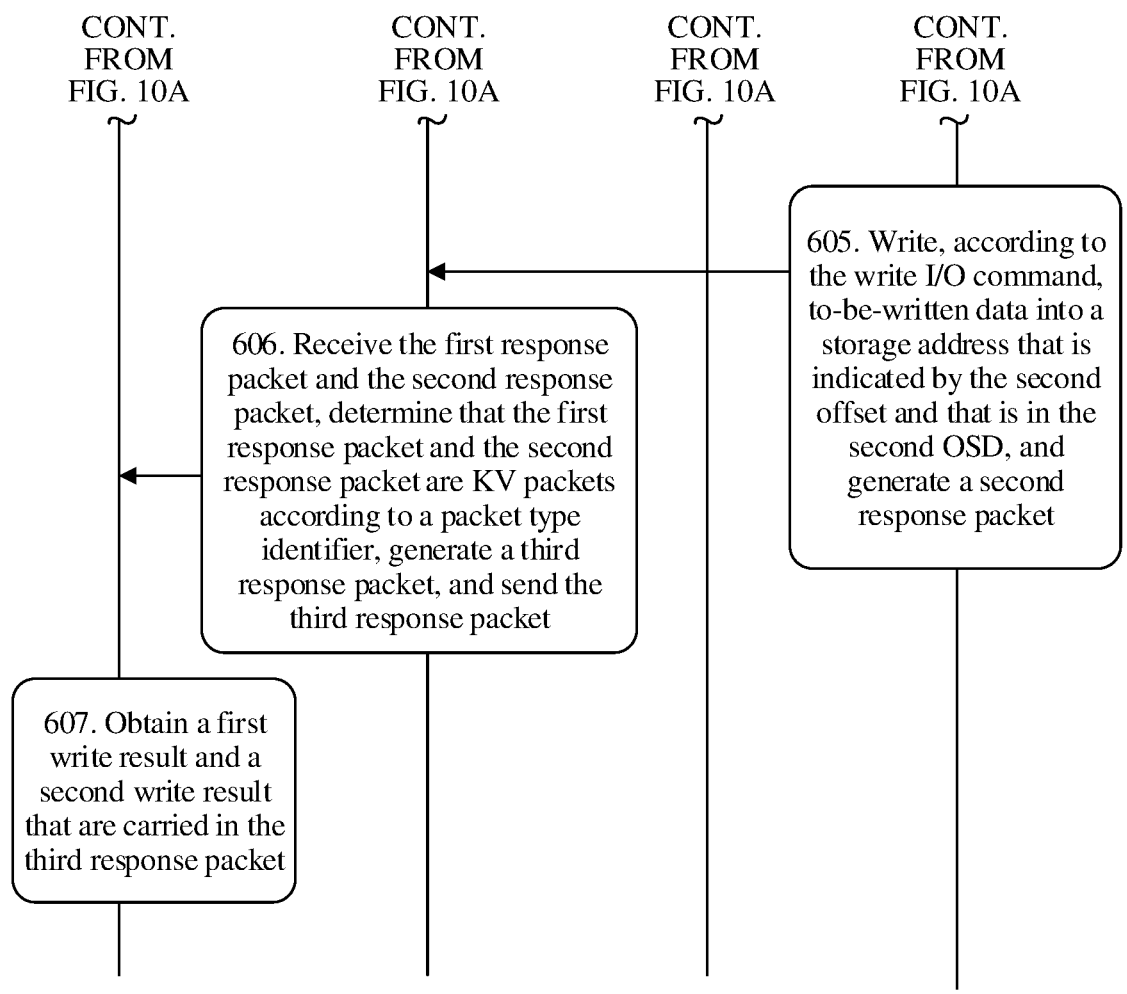

In an implementation scenario, to improve security of data storage, a computing node may write data into a plurality of storage nodes in a multi-copy form. For example, in the embodiments of the present disclosure, that the computing node writes data into two storage nodes in a two-copy form is used as an example for description. Referring to FIG. 10A and FIG. 10B, FIG. 10A and FIG. 10B are a flowchart of a second embodiment of an information processing method according to the present disclosure. The information processing method includes the following steps.

Step 601: A computing node 100 generates a first network packet, where the first network packet carries a resource identifier, a first offset, a write I/O command, to-be-written data, and a multi-copy operation code, and the computing node 100 sends the first network packet to a switching device 300.

An implementation in which the computing node 100 generates and sends the first network packet is similar to that in step 501, and details are not described in this embodiment of the present disclosure.

Step 602: The switching device 300 receives the first network packet, generates a second offset according to the first offset and a size of an OSD, and obtains, according to the resource identifier and the first offset, a first network address of a first storage node accommodating a first OSD on which an I/O operation is to be performed, an identifier of the first OSD, a second network address of a second storage node accommodating a second OSD on which a write operation is to be performed, and an identifier of the second OSD.

Similar to step 502, the switching device 300 searches a comparison table, and determines, according to the multi-copy operation code, two storage nodes into which the to-be-written data needs to be written and an identifier of an OSD into which the data is to be written on each storage node.

Step 603: The switching device 300 generates and sends a second network packet and a third network packet.

The switching device 300 generates a corresponding network packet for each storage node. The second network packet carries the second offset, the write I/O command, the to-be-written data, and the identifier of the first OSD, and a destination address of the second network packet is the first network address. The first OSD is an OSD into which the data is to be written in the first storage node 200.

The third network packet carries the second offset, the write I/O command, the to-be-written data, and the identifier of the second OSD, a destination address of the third network packet is the second network address, and the second OSD is an OSD into which the data is to be written in the second storage node 200'.

In this step, the switching device 300 may set that the second network packet carries a packet identifier 1, and set that the third network packet carries a packet identifier 2. When a subsequently received KV packet carries a packet identifier, the switching device determines that the KV packet is a response packet for the second network packet or the third network packet.

Step 604: The first storage node 200 receives the second network packet, writes, according to the write I/O command, the to-be-written data into a storage address that is indicated by the second offset and that is in the first OSD, and generates a first response packet, where the first response packet carries a first write result and a packet type identifier, and a destination address of the first response packet is a network address of the computing node.

In this step, the first storage node 200 sets that the first response packet carries the packet identifier 1.

Step 605: The second storage node 200' receives the third network packet, writes, according to the write I/O command, the to-be-written data into a storage address that is indicated by the second offset and that is the second OSD, and generates a second response packet, where the second response packet carries a second write result and a packet type identifier, and a destination address of the second response packet is the network address of the computing node.

In this step, the second storage node 200' sets that the second response packet carries the packet identifier 2.

Step 606: The switching device 300 receives the first response packet and the second response packet, determines that the first response packet and the second response packet are KV packets according to the packet type identifiers, generates a third response packet, and sends the third response packet, where the third response packet carries the first write result and the second write result, and a destination address of the third response packet is the network address of the computing node.

In this step, after determining that the first response packet is a KV packet, when the first response packet carries the packet identifier 1, the switching device 300 determines that the first response packet is the response packet for the first network packet. After determining that the second response packet is a KV packet, when the second response packet carries the packet identifier 2, the switching device 300 determines that the second response packet is the response packet for the second network packet. In this case, the switching device 300 may combine the write results respectively carried in the first network packet and the second network packet into the third response packet, and send the third response packet to the computing node.

A correspondence between a network packet and a response packet may be determined using a packet identifier. When the switching device 300 needs to simultaneously process KV packets sent by different computing nodes, the packet identifier may be used to ensure that write results correspond to a same computing node.

Step 607: The computing node 100 receives the third response packet, and obtains the first write result and the second write result that are carried in the third response packet.

This embodiment of the present disclosure is a multi-copy write procedure. The switching device 300 sends to-be-written data to at least two storage nodes for storage when the first network packet carries the multi-copy operation code. After receiving response packets returned by the at least two storage nodes, the switching device 300 determines a type of the response packets, and performs combined encapsulation on a plurality of response packets returned by the at least two storage nodes, to generate one response packet to be returned to the computing node 100. This embodiment of the present disclosure further expands a function of the switching device 300 such that the switching device 300 can convert, according to the multi-copy operation code, a write command from the computing node into a write command for a plurality of storage nodes, aggregate responses from a plurality of storage nodes into a single response, and return the single response to the computing node. Therefore, burden of the computing node is significantly reduced, and especially in a scenario with relatively large IO traffic, this embodiment of the present disclosure has a more obvious advantage.

Figure 11:
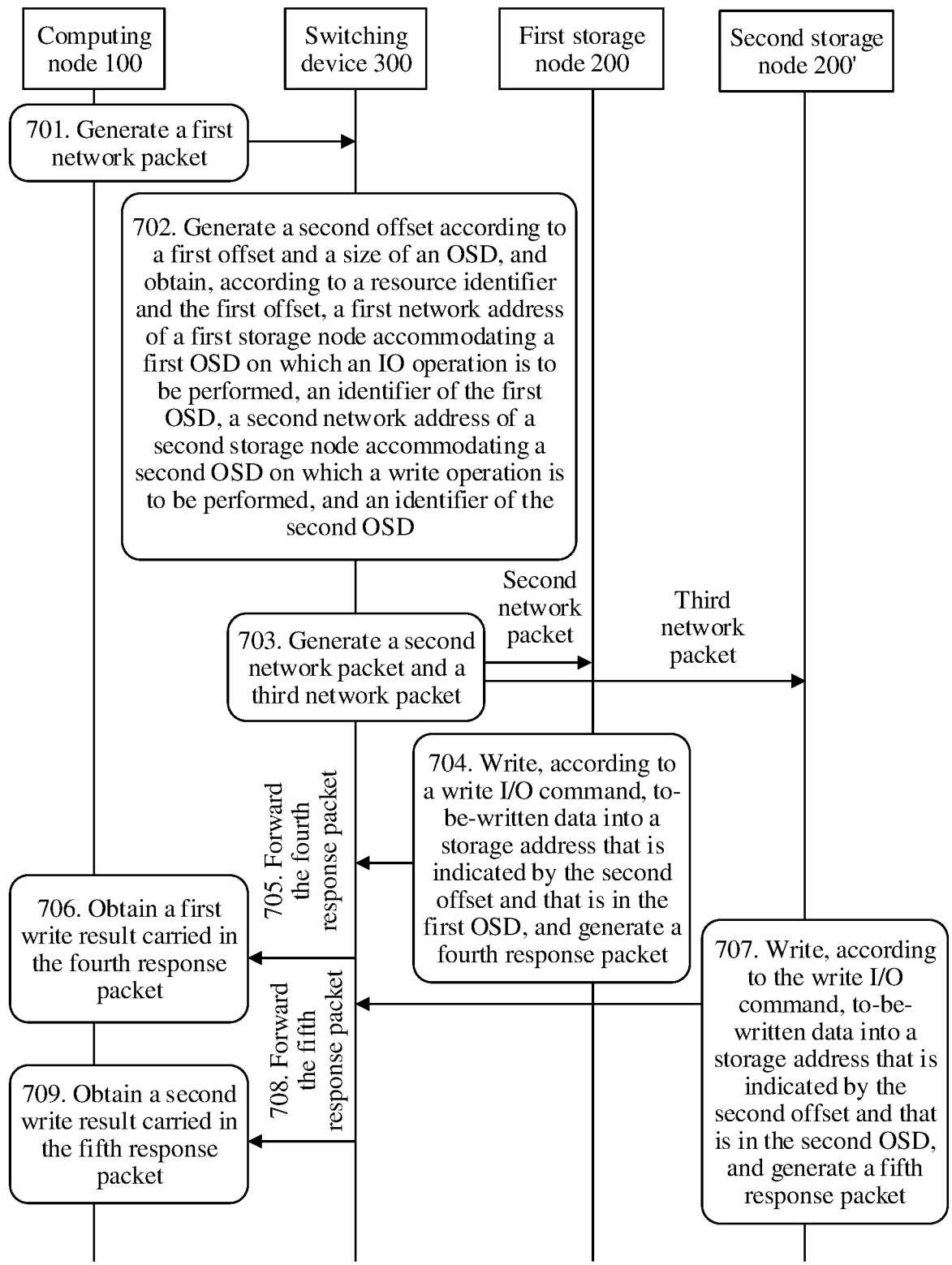
FIG. 11 is a flowchart of a third embodiment of an information processing method according to the present disclosure.

Referring to FIG. 11, FIG. 11 is a flowchart of a third embodiment of an information processing method according to the present disclosure. It is noteworthy that step 701 to step 703 in the information processing method shown in FIG. 11 are totally the same as step 601 to step 603 in FIG. 10A and FIG. 10B, and a difference is step 704 to step 709. Therefore, descriptions of step 701 to step 703 are omitted herein.

Step 704: A first storage node 200 receives the second network packet, writes, according to the write I/O command, the to-be-written data into a storage address that is indicated by the second offset and that is in the first OSD, generates a fourth response packet, and sends the fourth response packet to the switching device 300, where the fourth response packet carries a first write result, and a destination address of the fourth response packet is a network address of the computing node 100.

For example, the first storage node 200 sends the fourth response packet to a physical port 2 of the switching device 300.

Step 705: The switching device 300 forwards the fourth response packet to the computing node 100.

For example, when the switching device 300 determines that the fourth response packet does not carry a packet type identifier, and determines that the fourth response packet is a non-KV packet, the switching device 300 may select a physical port 1 according to the destination address of the fourth response packet, and forward the fourth response packet to the computing node 100 using the physical port 1.

Step 706: The computing node 100 receives the fourth response packet, and obtains the first write result carried in the fourth response packet.

Step 707: A second storage node 200' receives the third network packet, writes, according to the write I/O command, the to-be-written data into a storage address that is indicated by the second offset and that is in the second OSD, generates a fifth response packet, and sends the fifth response packet to the switching device 300, where the fifth response packet carries a second write result, and a destination address of the fifth response packet is the network address of the computing node 100.

For example, the second storage node 200' sends the fifth response packet to a physical port 3 of the switching device 300.

Step 708: The switching device 300 forwards the fifth response packet to the computing node 100.

For example, when the switching device 300 determines that the fifth response packet does not carry the packet type identifier, and determines that the fifth response packet is a non-KV packet, the switching device 300 may select the physical port 1 according to the destination address of the fifth response packet, and forward the fifth response packet to the computing node 100 using the physical port 1.

Step 709: The computing node 100 receives the fifth response packet, and obtains the second write result carried in the fifth response packet.

This embodiment of the present disclosure is another multi-copy write procedure. When the first network packet carries the multi-copy operation code, the switching device 300 sends the to-be-written data to at least two storage nodes for storage, determines a type of response packets after receiving the response packets returned by the at least two storage nodes, and directly forwards the response packets to the computing node 100 separately. In this embodiment of the present disclosure, a storage node does not need to set a packet type identifier to a response packet, and the storage node does not need to be modified. Therefore, there is conducive to system compatibility, and this embodiment of the present disclosure is particularly suitable for a scenario with relatively small IO traffic.

In this embodiment of the present disclosure, related packets may include a TCP packet and a User Datagram Protocol (UDP) packet. The packet type identifier may be set in an options field and a padding field that are in an IP packet header of the TCP packet or the UDP packet. In the TCP packet or the UDP packet, the options field and the padding field are usually idle, and therefore, these fields in the IP header are used to carry the packet type identifier. When determining a type of a packet, the switching device only needs to analyze the IP header, and does not need to disassemble an IP data field such that processing the packet can be accelerated.

Figure 13:
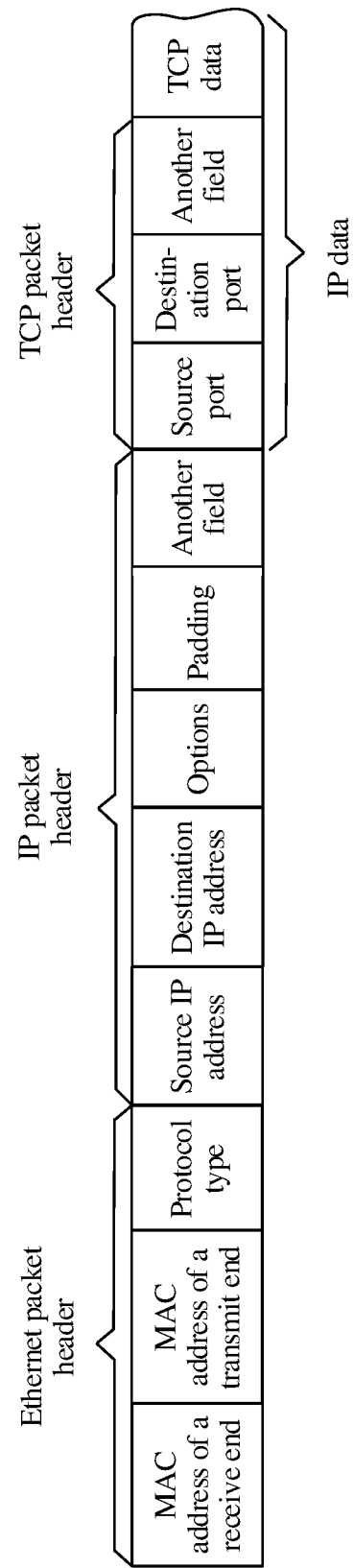
FIG. 13 is a schematic diagram of a format of a TCP packet according to an embodiment of the present disclosure.

The network address in this embodiment of the present disclosure may be a MAC address or an IP address. For example, referring to FIG. 13, FIG. 13 is a schematic diagram of a format of a TCP packet according to an embodiment of the present disclosure. As shown in FIG. 13, an IP packet header is provided with an options field and a padding field. The options field and the padding field may be used to carry a packet type identifier.

In this embodiment of the present disclosure, the destination address of the second network packet sent by the switching device is the first storage node, and therefore, a destination port of the second network packet may be a network port of an OSD component of the first storage node, for example, 10002. The OSD component may learn that the second network packet is for the OSD component using the destination port of the second network packet, and therefore, the OSD component may parse the second network packet. Processing of the third network packet is similar, and details are not described herein.

In addition, a destination address of a response packet sent by the storage node or a switch is a computing node, and therefore, a destination port of the response packet may be a network port of a VBS component of the computing node, for example, 10001. The VBS component may learn that the response packet is for the VBS component using the destination port of the response packet, and therefore, the VBS component may parse the response packet.

Figure 12:
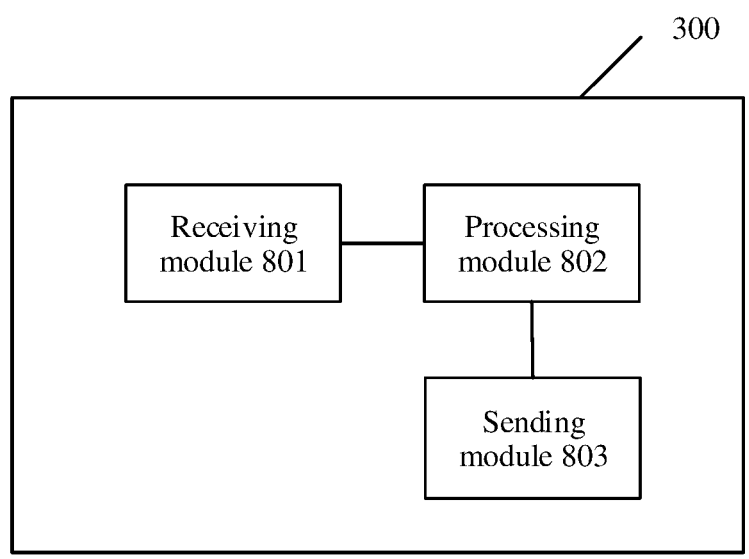
FIG. 12 is a schematic diagram of another apparatus structure of a switching device according to the present disclosure.

Referring to FIG. 12, FIG. 12 is a schematic diagram of another apparatus structure of a switching device 300 according to the present disclosure. The switching device 300 includes a receiving module 801 configured to receive a first network packet sent by a computing node, where the first network packet carries a resource identifier, a first offset, and an I/O command, a processing module 802 configured to generate a second offset according to the first offset and a size of an OSD, obtain, according to the resource identifier and the first offset, a first network address of a first storage node accommodating a first OSD on which an I/O operation is to be performed and an identifier of the first OSD, and generate a second network packet, where the second network packet carries the second offset, the I/O command, and the identifier of the first OSD, and a destination address of the second network packet is the first network address, and a sending module 803 configured to send the second network packet to the first storage node.

Optionally, the I/O command includes a write I/O command and to-be-written data. The first network packet further carries a multi-copy operation code. The processing module 802 is configured to obtain, according to the resource identifier and the first offset, the first network address, the identifier of the first OSD, a second network address of a second storage node accommodating a second OSD on which a write operation is to be performed, and an identifier of the second OSD.

The processing module 802 is further configured to generate a third network packet according to the multi-copy operation code, where the third network packet carries the second offset, the write I/O command, the to-be-written data, and the identifier of the second OSD, and a destination address of the third network packet is the second network address.

The sending module 803 is further configured to send the third network packet to the second storage node.

Optionally, the receiving module 801 is further configured to receive a first response packet sent by the first storage node and a second response packet sent by the second storage node. The first response packet carries a first write result and a packet type identifier, and a destination address of the first response packet is a network address of the computing node. The second response packet carries a second write result and a packet type identifier, and a destination address of the second response packet is the network address of the computing node. The processing module 802 is further configured to determine that the first response packet and the second response packet are KV packets according to the packet type identifiers, generate a third response packet, and send the third response packet to the computing node. The third response packet carries the first write result and the second write result, and a destination address of the third response packet is the network address of the computing node.

Optionally, the processing module 802 is configured to perform a modulo operation on the first offset using the size of the OSD as a divisor, and use an obtained result as the second offset.

Optionally, the resource identifier is a volume number of a virtual disk on the computing node, and the processing module 802 is configured to obtain, according to the volume number and the first offset, the first network address of the first storage node accommodating the first OSD on which the I/O operation is to be performed and the identifier of the first OSD.

Optionally, the resource identifier is a file system identifier and a file identifier, and the processing module 802 is configured to obtain, according to the file system identifier, the file identifier, and the first offset, the first network address of the first storage node accommodating the first OSD on which the I/O operation is to be performed and the identifier of the first OSD.

Optionally, the first network packet further carries a packet type identifier, and the processing module 802 is further configured to determine that the first network packet is the KV packet according to the packet type identifier.

Optionally, the processing module 802 is further configured to perform a rounding operation on the first offset according to the size of the OSD to obtain a rounding result, obtain a key corresponding to the resource identifier and the rounding result, and search a comparison table to determine the first network address of the first storage node and the identifier of the first OSD that correspond to the key. The comparison table includes a correspondence between a key, a network address of a storage node, and an identifier of an OSD.

Optionally, the comparison table includes a global view table and a partition map table. The global view table includes a correspondence between a key and an OSD number, and the OSD number is used to identify an OSD in a storage system. The partition map table includes a correspondence between an OSD number, a network address of a storage node, and an identifier of an OSD. The processing module 802 is configured to search the global view table to determine an OSD number corresponding to the obtained key, and search the partition map table to determine the first network address of the first storage node accommodating the first OSD and the identifier of the first OSD that correspond to the OSD number.

Optionally, the receiving module 801 is further configured to receive the global view table and the partition map table that are sent by a metadata control node.

This application provides a switch. The switch includes a processor 301, a memory 302, and a plurality of physical ports 1 to 4. The switch performs functions of the switching device 300 described in the foregoing aspects.

The processor 301, the memory 302, and the physical ports 1 to 4 are separately connected to a bus 303. The physical ports 1 to 4 may be connected to a computing node or a storage node using a cable, and receive a network packet from the computing node or the storage node. The network packet passes through a transceiver and the bus, and is parsed and processed by the processor.

The first physical port 1 is configured to receive a first network packet sent by a computing node. The first network packet carries a resource identifier, a first offset, and an I/O command. The processor 301 runs a program instruction to perform steps of generating a second offset according to the first offset and a size of an OSD, obtaining, according to the resource identifier and the first offset, a first network address of a first storage node accommodating a first OSD on which an I/O operation is to be performed and an identifier of the first OSD, and generating a second network packet. The second network packet carries the second offset, the I/O command, and the identifier of the first OSD, and a destination address of the second network packet is the first network address. The second physical port 2 is configured to send the second network packet to the first storage node.

The processor 301 is further configured to support the switching device in performing a corresponding function in the foregoing method, for example, generating or processing data and/or information related in the foregoing method.

In this embodiment of the present disclosure, searching for or computing a destination address based on a key and final encapsulation of network IO are not completed by the computing node, but are completed by the switch such that load of the computing node is reduced. By adding different processing engines such as a Field Programmable Gate Array (FPGA), a dedicated central processing unit (CPU), an Application Specific Integrated Circuits (ASIC), and a Network Processor (NP) to the switch, for processing packets having a fixed format of data, efficiency and performance of the switch are far better than those of a general processor.

It should be noted that any apparatus embodiment described above is merely an example. The units described as separate parts may or may not be physically separate, and parts displayed as units may or may not be physical units, and may be located in one position, or may be distributed on a plurality of network units. Some or all of the modules may be selected according to actual requirements to achieve the objectives of the solutions of the embodiments. In addition, in the accompanying drawings of the apparatus embodiments provided in the present disclosure, connection relationships between modules indicate that the modules have communication connections with each other, which may be implemented as one or more communications buses or signal cables. A person of ordinary skill in the art may understand and implement the embodiments of the present disclosure without creative efforts.

Based on the description of the foregoing implementations, a person skilled in the art may clearly understand that the present disclosure may be implemented by software in addition to necessary universal hardware, or by dedicated hardware, including an application-specific integrated circuit, a dedicated CPU, a dedicated memory, a dedicated component, and the like. Generally, any functions that can be performed by a computer program can be easily implemented using corresponding hardware. Moreover, a hardware structure used to achieve a same function may be of various forms, for example, in a form of an analog circuit, a digital circuit, a dedicated circuit, or the like. However, in the present disclosure, software program implementation is a better implementation in most cases. Based on such an understanding, the technical solutions of the present disclosure essentially or the part contributing to the other approaches may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present disclosure.

It may be clearly understood by a person skilled in the art that, for a detailed working process of the foregoing system, apparatus, and unit, reference may be made to a corresponding process in the foregoing method embodiments, and details are not described herein again.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A storage system, comprising:
   a switching device; and
   a computing node coupled to the switching device and configured to send a first network packet to the switching device, wherein the first network packet carries a resource identifier, a first offset, and an input/output (I/O) command, and
   wherein the switching device is configured to:
      generate a second offset according to the first offset and a size of an object storage device (OSD);
      obtain, according to the resource identifier and the first offset, a first network address of a first storage node accommodating a first OSD on which an I/O operation is to be performed and an identifier of the first OSD;
      generate a second network packet; and
      send the second network packet to the first storage node, wherein the second network packet carries the second offset, the I/O command, and the identifier of the first OSD, and wherein a destination address of the second network packet is the first network address.

2. The storage system of claim 1, further comprising a plurality of storage nodes coupled to the switching device, wherein the first storage node comprised in the storage nodes is configured to:
   receive the second network packet from the switching device; and
   perform, according to the I/O command, the I/O operation on a storage address indicated by the second offset in the first OSD.

3. A data processing method, comprising:
   receiving, by a switching device, a first network packet from a computing node, wherein the first network packet carries a resource identifier, a first offset, and an input/output (I/O) command;
   generating, by the switching device, a second offset according to the first offset and a size of an object storage device (OSD);
   obtaining, by the switching device according to the resource identifier and the first offset, a first network address of a first storage node accommodating a first OSD on which an I/O operation is to be performed and an identifier of the first OSD;
   generating, by the switching device, a second network packet; and
   sending, by the switching device, the second network packet to the first storage node, wherein the second network packet carries the second offset, the I/O command, and the identifier of the first OSD, and wherein a destination address of the second network packet is the first network address.

4. The data processing method of claim 3, wherein the I/O command comprises a write I/O command and to-be-written data, wherein the first network packet further carries a multi-copy operation code, wherein obtaining the first network address of the first storage node and the identifier of the first OSD comprises obtaining, by the switching device, the first network address, the identifier of the first OSD, a second network address of a second storage node accommodating a second OSD on which a write operation is to be performed, and an identifier of the second OSD according to the resource identifier and the first offset, and wherein the data processing method further comprises:
   generating, by the switching device, a third network packet according to the multi-copy operation code; and
   sending, by the switching device, the third network packet to the second storage node, wherein the third network packet carries the second offset, the write I/O command, the to-be-written data, and the identifier of the second OSD, and wherein a destination address of the third network packet is the second network address.

5. The data processing method of claim 4, further comprising:
   receiving, by the switching device, a first response packet from the first storage node and a second response packet from the second storage node, wherein the first response packet carries a first write result and a first packet type identifier, wherein a destination address of the first response packet is a network address of the computing node, wherein the second response packet carries a second write result and a second packet type identifier, and wherein a destination address of the second response packet is the network address of the computing node;
   determining, by the switching device, that the first response packet and the second response packet are key value (KV) packets according to packet type identifiers;
   generating, by the switching device, a third response packet; and
   sending, by the switching device, the third response packet to the computing node, wherein the third response packet carries the first write result and the second write result, and wherein a destination address of the third response packet is the network address of the computing node.

6. The data processing method of claim 3, wherein generating the second offset comprises:
   performing, by the switching device, a modulo operation on the first offset using the size of the OSD as a divisor; and
   setting, by the switching device, an obtained result from the modulo operation as the second offset.

7. The data processing method of claim 3, wherein the resource identifier is a volume number of a virtual disk on the computing node, and wherein obtaining the first network address of the first storage node and the identifier of the first OSD comprises obtaining, by the switching device according to the volume number and the first offset, the first network address of the first storage node accommodating the first OSD on which the I/O operation is to be performed and the identifier of the first OSD.

8. The data processing method of claim 3, wherein the resource identifier is a file system identifier and a file identifier, and wherein obtaining the first network address of the first storage node and the identifier of the first OSD comprises obtaining, by the switching device according to the file system identifier, the file identifier, and the first offset, the first network address of the first storage node accommodating the first OSD on which the I/O operation is to be performed and the identifier of the first OSD.

9. The data processing method of claim 3, wherein the first network packet further carries a packet type identifier, and wherein before generating the second offset and obtaining the first network address of the first storage node and the identifier of the first OSD, the data processing method further comprises determining, by the switching device, that the first network packet is a key value (KV) packet according to the packet type identifier.

10. The data processing method of claim 3, wherein generating the second offset and obtaining the first network address of the first storage node and the identifier of the first OSD comprises:

performing, by the switching device according to the size of the OSD, a rounding operation on the first offset to obtain a rounding result;

obtaining, by the switching device, a key corresponding to the resource identifier and the rounding result; and searching, by the switching device, a comparison table to determine the first network address of the first storage node and the identifier of the first OSD corresponding to the key, wherein the comparison table comprises a correspondence between the key, the first network address of the first storage node, and the identifier of the first OSD.

11. The data processing method of claim 10, wherein the comparison table comprises a global view table and a partition map table, wherein the global view table comprises a correspondence between the key and an OSD number, wherein the OSD number identifies the first OSD in a storage system, wherein the partition map table comprises a correspondence between the OSD number, the first network address of the first storage node, and the identifier of the first OSD, and wherein searching the comparison table comprises:

searching, by the switching device, the global view table to determine the OSD number corresponding to the key; and searching, by the switching device, the partition map table to determine the first network address of the first storage node accommodating the first OSD and the identifier of the first OSD corresponding to the OSD number.

12. The data processing method of claim 11, wherein before searching the global view table and the partition map table, the data processing method further comprises receiving, by the switching device, the global view table and the partition map table from a metadata control node.

13. A switch, comprising:
a bus;
a memory coupled to the bus and storing a plurality of program instructions;
a plurality of physical ports coupled to the bus; and
a processor coupled to the bus, wherein the program instructions cause the processor to be configured to:
receive, using the physical ports, a first network packet from a computing node, wherein the first network packet carries a resource identifier, a first offset, and an input/output (I/O) command;
generate a second offset according to the first offset and a size of an object storage device (OSD);
obtain, according to the resource identifier and the first offset, a first network address of a first storage node accommodating a first OSD on which an I/O operation is to be performed and an identifier of the first OSD;
generate a second network packet, wherein the second network packet carries the second offset, the I/O command, and the identifier of the first OSD, and wherein a destination address of the second network packet is the first network address; and
send, using the physical ports, the second network packet to the first storage node.

14. The switch of claim 13, wherein the I/O command comprises a write I/O command and to-be-written data, wherein the first network packet further carries a multi-copy operation code, and wherein the program instructions further cause the processor to be configured to:
obtain the first network address, the identifier of the first OSD, a second network address of a second storage node accommodating a second OSD on which a write operation is to be performed, and an identifier of the second OSD according to the resource identifier and the first offset;
generate a third network packet according to the multi-copy operation code; and
send, using the physical ports, the third network packet to the second storage node, wherein the third network packet carries the second offset, the write I/O command, the to-be-written data, and the identifier of the second OSD, and wherein a destination address of the third network packet is the second network address.

15. The switch of claim 14, wherein the program instructions further cause the processor to be configured to:
receive, using the physical ports, a first response packet from the first storage node and a second response packet from the second storage node, wherein the first response packet carries a first write result and a first packet type identifier, wherein a destination address of the first response packet is a network address of the computing node, wherein the second response packet carries a second write result and a second packet type identifier, and wherein a destination address of the second response packet is the network address of the computing node;
determine that the first response packet and the second response packet are key value (KV) packets according to packet type identifiers;
generate a third response packet;
send, using the physical ports, the third response packet to the computing node, wherein the third response packet carries the first write result and the second write result, and wherein a destination address of the third response packet is the network address of the computing node.

16. The switch of claim 13, wherein the program instructions further cause the processor to be configured to:
perform a modulo operation on the first offset using the size of the OSD as a divisor; and
set an obtained result of the modulo operation as the second offset.

17. The switch of claim 13, wherein the resource identifier is a volume number of a virtual disk on the computing node, and wherein the program instructions further cause the processor to be configured to obtain the first network address of the first storage node accommodating the first OSD on which the I/O operation is to be performed and the identifier of the first OSD according to the volume number and the first offset.

18. The switch of claim 13, wherein the resource identifier is a file system identifier and a file identifier, and wherein the program instructions further cause the processor to be configured to obtain the first network address of the first storage node accommodating the first OSD on which the I/O operation is to be performed and the identifier of the first OSD according to the file system identifier, the file identifier, and the first offset.

19. The switch of claim 13, wherein the first network packet further carries a packet type identifier, and wherein the program instructions further cause the processor to be configured to determine that the first network packet is a key value (KV) packet according to the packet type identifier before generating the second offset according to the first offset and the size of the OSD.

20. The switch of claim 13, wherein the program instructions further cause the processor to be configured to:
perform a rounding operation on the first offset to obtain a rounding result according to the size of the OSD;

obtain a key corresponding to the resource identifier and the rounding result;

search a comparison table to determine the first network address of the first storage node and the identifier of the first OSD corresponding to the key, wherein the comparison table comprises a correspondence between the key, the first network address of the first storage node, and the identifier of the first OSD.

* * * * *